(12) United States Patent
Min

(10) Patent No.: US 11,776,298 B2
(45) Date of Patent: Oct. 3, 2023

(54) UNDER DISPLAY FINGERPRINT SENSOR WITH IMPROVED CONTRAST RATIO

(71) Applicant: Hangzhou Single Micro Electronic Co., LTD., Zheijang (CN)

(72) Inventor: Byung Il Min, Zheijang (KR)

(73) Assignee: HANGZHOU SINGLE MICRO ELECTRONIC CO., LTD., Zheijang (CN)

( * ) Notice: Subject to any disclaimer, the term of this patent is extended or adjusted under 35 U.S.C. 154(b) by 0 days.

(21) Appl. No.: 17/513,020

(22) Filed: Oct. 28, 2021

(65) Prior Publication Data

US 2022/0138449 A1    May 5, 2022

(30) Foreign Application Priority Data

Oct. 29, 2020 (CN) .......................... 202011186989.1
Nov. 18, 2020 (CN) .......................... 202011296534.5

(51) Int. Cl.
*G06V 40/13* (2022.01)
*G02B 3/00* (2006.01)
*G02B 5/30* (2006.01)

(52) U.S. Cl.
CPC ....... *G06V 40/1318* (2022.01); *G02B 3/0006* (2013.01); *G02B 5/3025* (2013.01); *G02B 5/3083* (2013.01)

(58) Field of Classification Search
CPC .............. G06V 40/1318; G02B 3/0006; G02B 5/3025; G02B 5/3083
See application file for complete search history.

(56) References Cited

U.S. PATENT DOCUMENTS

| | | | |
|---|---|---|---|
| 9,612,152 B2 | 4/2017 | Dejong et al. | |
| 10,777,623 B2 | 9/2020 | Rhee et al. | |
| 2018/0357462 A1* | 12/2018 | Mackey | G02F 1/13338 |
| 2019/0034690 A1* | 1/2019 | Jung | G06V 40/1318 |
| 2019/0079236 A1 | 3/2019 | Hung | |
| 2020/0387684 A1* | 12/2020 | Setlak | H01L 27/3234 |
| 2021/0089740 A1* | 3/2021 | Wang | H01L 27/3244 |
| 2021/0319199 A1* | 10/2021 | Jiang | H01L 27/14678 |

FOREIGN PATENT DOCUMENTS

JP    2009-229908 A    10/2009

* cited by examiner

*Primary Examiner* — Lixi C Simpson
(74) *Attorney, Agent, or Firm* — Grossman, Tucker, Perreault & Pfleger, PLLC; Kevin J. Carroll

(57) ABSTRACT

Under-display fingerprint sensor of generating a fingerprint image disclosed. Under-display fingerprint sensor includes a light selection layer, being disposed under a display panel, configured for converting a downward circularly-polarized light into a downward linearly-polarized light, and configured for converting an unpolarized light into a sensor linearly-polarized light, a plurality of lenses, being disposed apart from the light selection layer and configured for refracting the downward linearly-polarized light and the sensor linearly-polarized light that propagate in a perpendicular direction toward each focal point, and an image sensor having a plurality of light receiving units disposed at each focal point of the plurality of lenses to receive the downward linearly-polarized light and the sensor linearly-polarized light that are refracted toward each focal point.

13 Claims, 18 Drawing Sheets

UNDER DISPLAY FINGERPRINT SENSOR WITH IMPROVED CONTRAST RATIO

TECHNICAL FIELD

The present invention relates to fingerprint sensor.

BACKGROUND

The fingerprint sensor picks up an image of fingerprint and converts it into electrical signals. In order to pick up the image, a conventional optical fingerprint sensor includes an optical system for irradiating and reflecting light on the fingerprint. However, since optical systems such as prisms, reflection mirrors, and lenses generally have a considerable volume, it is difficult to miniaturize an electronic device having the optical fingerprint sensor.

On the other hand, the types and number of electronic devices equipped with the fingerprint sensor such as mobile phones and tablets are increasing. In order to mount the fingerprint sensor on the front of the electronic device, a sensing part of the fingerprint sensor in contact with the fingerprint must be exposed to the outside. Therefore, when the entire front surface of the electronic device is covered with a protective medium, for example, a glass cover or a transparent film, in order to protect the display panel, it is difficult to mount the fingerprint sensor such as a capacitive type that detects a change in capacitance on the electronic device. In addition, it is difficult to position the fingerprint sensor under the display panel.

SUMMARY

According to one aspect of the embodiment, there is provided an under-display fingerprint sensor of generating a fingerprint image of a finger in contact with a glass cover disposed over a display panel. The under-display fingerprint sensor includes a light selection layer, being disposed under a display panel, configured for converting a downward circularly-polarized light that is reflected in a region below a valley of a fingerprint in contact with an upper surface of a glass cover into a downward linearly-polarized light, and configured for converting an unpolarized light that propagates downwardly from the display panel into a sensor linearly-polarized light, a plurality of lenses, being disposed apart from the light selection layer, configured for refracting the downward linearly-polarized light and the sensor linearly-polarized light that propagate in a perpendicular direction toward each focal point, and configured for deviating the downward linearly-polarized light and the sensor linearly-polarized light that propagate at an angle other than perpendicular from the focal point, and an image sensor having a plurality of light receiving units disposed at each focal point of the plurality of lenses to receive the downward linearly-polarized light and the sensor linearly-polarized light that are refracted toward each focal point.

In one embodiment, the light selection layer includes a sensor retarder configured for converting the downwardly circularly-polarized light into the downward linearly-polarized light and configured for passing the unpolarized light and a sensor polarizer, being disposed under the sensor retarder, configured for passing the downward linearly-polarized light, and configured for converting the unpolarized light into the sensor linearly-polarized light, wherein a light amount of the unpolarized light is reduced by the sensor polarizer.

In one embodiment, the sensor polarizer has a polarization axis inclined at +45 degrees with respect to a slow axis of the sensor retarder layer.

In one embodiment, a first light receiving unit among the plurality of light receiving units receives the downward linearly-polarized light and the sensor linearly-polarized light and a second light receiving unit among the plurality of light receiving units receives the sensor linearly-polarized light.

In one embodiment, a lower surface of the light selection layer is an interface between two media having different refractive indices, wherein the downward linearly-polarized light and the sensor linearly-polarized light perpendicularly incident on the lower surface of the light selection layer propagate in the perpendicular direction and the downward linearly-polarized light and the sensor linearly-polarized light incident on the lower surface of the light selection layer at the angle other than perpendicular are refracted at a refraction angle greater than an incidence angle.

In one embodiment, the light selection layer includes a first sensor retarder configured for converting the downward circularly-polarized light into the downward linearly-polarized light, a first sensor polarizer, being disposed under the first sensor retarder, configured for passing the downward linearly-polarized light, and configured for converting the unpolarized light into a first sensor linearly-polarized light and a second sensor polarizer, being disposed under the first sensor retarder, configured for attenuating the downward linearly-polarized light, configured for converting the unpolarized light into a second sensor linearly-polarized light, wherein a combination of the first sensor retarder and the first sensor polarizer is a first light path and a combination of the first sensor retarder and the second sensor polarizer is a second light path.

In one embodiment, the light selection layer includes a first sensor retarder and a second sensor retarder having slow axes orthogonal to each other and a first sensor polarizer disposed under the first sensor retarder and the second sensor retarder, wherein a combination of the first sensor retarder and the first sensor polarizer is a first light path, and a combination of the second sensor retarder and the first sensor polarizer is a second light path.

In one embodiment, the light selection layer includes a first sensor retarder and a second sensor retarder alternately disposed in a first direction and having slow axes orthogonal to each other and a first sensor polarizer and a second sensor polarizer alternately disposed under the first sensor retarder and the second sensor retarder in a second direction and having polarization axes orthogonal to each other, wherein a combination of the first sensor retarder and the first sensor polarizer and a combination of the second sensor retarder and the second sensor polarizer are a first light path and a combination of the second sensor retarder and the first sensor polarizer and a combination of the first sensor retarder and the first sensor polarizer are a second light path.

In one embodiment, the under-display fingerprint sensor further includes an inclined light blocking structure, being interposed between the light selection layer and the image sensor and having a plurality of through holes extending vertically from an upper surface to a lower surface thereof, wherein one of the plurality of lenses is accommodated in one of the plurality of through holes.

In one embodiment, the image sensor includes a plurality of layers being interposed between an upper surface of the image sensor and the plurality of light receiving units and extending in a horizontal direction, wherein the plurality of layers have openings formed over each of the plurality of light receiving units.

In one embodiment, diameters of the openings formed in the plurality of layers decreases as it approaches the plurality of light receiving units.

In one embodiment, the under-display fingerprint sensor further includes an inclined light blocking structure being disposed on a lower surface of the light selection layer and having a plurality of layers that extend in a horizontal direction, wherein the plurality of layers have openings formed over each of the plurality of lenses, wherein a lower surface of the inclined light blocking structure is spaced apart from the plurality of lenses.

In one embodiment, the under-display fingerprint sensor further includes a light blocking layer formed in a flat surface between the plurality of lenses to block light incident into the image sensor.

In one embodiment, one lens corresponds to a plurality of sub light receiving units constituting one light receiving unit and is configured for focusing light belonging to a range of perpendicular incidence angle that has passed through a plurality of light paths on each of the plurality of sub light receiving units.

According to another aspect of the embodiment, there is provided an under-display fingerprint sensor of generating a fingerprint image of a finger in contact with a glass cover disposed over a display panel. The under-display fingerprint sensor includes a plurality of lenses, being disposed under a display panel, configured for refracting a downward circularly-polarized light being that is reflected in a region below a valley of a fingerprint in contact with an upper surface of a glass cover and propagates downwardly in a perpendicular direction and an unpolarized light that propagates downwardly in the perpendicular direction from the display panel toward each focal point, and configured for deviating the downward linearly-polarized light and the sensor linearly-polarized light that propagate at an angle other than perpendicular from the focal point, a light selection layer, being disposed under the plurality of lenses, configured for converting the downward circularly-polarized light into a downward linearly-polarized light, and configured for converting the unpolarized light into a sensor linearly-polarized light and an image sensor having a plurality of light receiving units disposed at each focal point of the plurality of lenses to receive the downward linearly-polarized light and the sensor linearly-polarized light that are refracted toward each focal point.

In one embodiment, the light selection layer includes a sensor retarder configured for converting the downwardly circularly-polarized light into the downward linearly-polarized light and configured for passing the unpolarized light and a sensor polarizer, being disposed under the sensor retarder, configured for passing the downward linearly-polarized light, and configured for converting the unpolarized light into the sensor linearly-polarized light, wherein a light amount of the unpolarized light is reduced by the sensor polarizer.

In one embodiment, the under-display fingerprint sensor further includes an inclined light blocking structure being interposed between the plurality of lenses and the sensor retarder and having a plurality of layers that extend in a horizontal direction, wherein the plurality of layers have openings formed under each of the plurality of lenses.

In one embodiment, the under-display fingerprint sensor further include an inclined light blocking structure being interposed between the sensor polarizer and the image sensor and having a plurality of layers that extend in a horizontal direction, wherein the plurality of layers have openings formed under each of the plurality of lenses.

In one embodiment, the under-display fingerprint sensor further includes a plurality of light blocking regions and a plurality of light passing regions being interposed between the sensor retarder and the sensor polarizer and extending in a horizontal direction, wherein the light passing region is disposed under the lens.

In one embodiment, a lower surface of the display panel is an interface between two media having different refractive indices, wherein the downward linearly-polarized light and the sensor linearly-polarized light perpendicularly incident on the lower surface of the display panel propagate in the perpendicular direction and the downward linearly-polarized light and the sensor linearly-polarized light incident on the lower surface of the display panel at the angle other than perpendicular are refracted at a refraction angle greater than an incidence angle.

In one embodiment, the light selection layer includes a first sensor retarder configured for converting the downward circularly-polarized light into the downward linearly-polarized light, a first sensor polarizer, being disposed under the first sensor retarder, configured for passing the downward linearly-polarized light, and configured for converting the unpolarized light into a first sensor linearly-polarized light and a second sensor polarizer, being disposed under the first sensor retarder, configured for attenuating the downward linearly-polarized light, configured for converting the unpolarized light into a second sensor linearly-polarized light, wherein a combination of the first sensor retarder and the first sensor polarizer is a first light path and a combination of the first sensor retarder and the second sensor polarizer is a second light path.

In one embodiment, the light selection layer includes a first sensor retarder and a second sensor retarder having slow axes orthogonal to each other and a first sensor polarizer disposed under the first sensor retarder and the second sensor retarder, wherein a combination of the first sensor retarder and the first sensor polarizer is a first light path, and a combination of the second sensor retarder and the first sensor polarizer is a second light path.

In one embodiment, the light selection layer includes a first sensor retarder and a second sensor retarder alternately disposed in a first direction and having slow axes orthogonal to each other and a first sensor polarizer and a second sensor polarizer alternately disposed under the first sensor retarder and the second sensor retarder in a second direction and having polarization axes orthogonal to each other, wherein a combination of the first sensor retarder and the first sensor polarizer and a combination of the second sensor retarder and the second sensor polarizer are a first light path and a combination of the second sensor retarder and the first sensor polarizer and a combination of the first sensor retarder and the first sensor polarizer are a second light path.

In one embodiment, the under-display fingerprint sensor further includes an inclined light blocking structure, being interposed between the display panel and the light selection layer and having a plurality of through holes extending vertically from an upper surface to a lower surface thereof, wherein one of the plurality of lenses is accommodated in one of the plurality of through holes.

In one embodiment, the under-display fingerprint sensor further includes an inclined light blocking structure being disposed on a lower surface of the display panel and having a plurality of layers that extend in a horizontal direction, wherein the plurality of layers have openings formed over each of the plurality of lenses, wherein a lower surface of the inclined light blocking structure is spaced apart from the plurality of lenses.

In one embodiment, the under-display fingerprint sensor further includes an inclined light blocking structure being interposed between the plurality of lenses and the light selection layer and having a plurality of layers that extend in a horizontal direction, wherein the plurality of layers have openings formed under each of the plurality of lenses.

In one embodiment, the under-display fingerprint sensor further includes an inclined light blocking structure being interposed between the light selection layer and the image sensor and having a plurality of layers that extend in a horizontal direction, wherein the plurality of layers have openings formed under each of the plurality of lenses.

BRIEF DESCRIPTION OF THE DRAWINGS

Hereinafter, embodiments of the invention will be described with reference to the accompanying drawings. For the purpose of easy understanding of the invention, the same elements will be referred to by the same reference signs. Configurations illustrated in the drawings are examples for describing the invention, and do not restrict the scope of the invention. Particularly, in the drawings, some elements are slightly exaggerated for the purpose of easy understanding of the invention. Since the drawings are used to easily understand the invention, it should be noted that widths, thicknesses, and the like of elements illustrated in the drawings might change at the time of actual implementation thereof.

DESCRIPTION OF EMBODIMENTS

Figure 1:
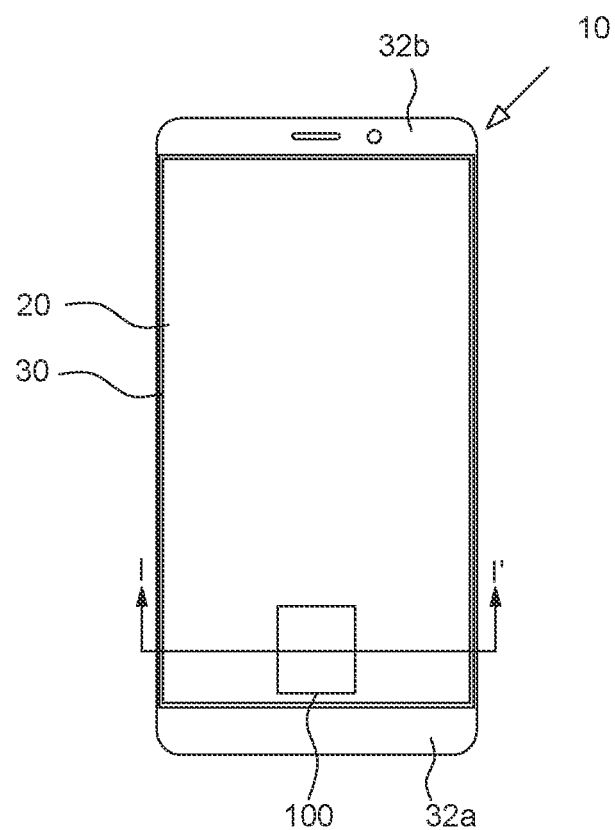
FIG. 1 is an exemplary diagram schematically illustrating an electronic device having an under-display fingerprint sensor.

Embodiments which will be described below with reference to the accompanying drawings can be implemented singly or in combination with other embodiments. But this is not intended to limit the present invention to a certain embodiment, and it should be understood that all changes, modifications, equivalents or replacements within the spirits and scope of the present invention are included. Especially, any of functions, features, and/or embodiments can be implemented independently or jointly with other embodiments. Accordingly, it should be noted that the scope of the invention is not limited to the embodiments illustrated in the accompanying drawings.

On the other hand, among terms used in this specification, terms such as "substantially," "almost," and "about" are used to take consideration of a margin or an error at the time of actual embodiment. For example, "substantially 90 degrees" should be construed to include angles at which the same advantages as at 90 degrees can be expected. For example, "almost zero" should be construed to include a quantity which is slightly present but is ignorable.

On the other hand, unless otherwise mentioned, "lateral" or "horizontal" is used to mention a right-left direction in the drawings, and "perpendicular" or "vertical" is used to mention an up-down direction in the drawings. Unless otherwise defined, an angle, an incidence angle, and the like are defined with respect to a virtual straight line perpendicular to a horizontally flat surface illustrated in the drawings.

In the accompanying drawings, the same or similar elements will be referred to by the same reference numerals.

FIG. 1 is an exemplary diagram schematically illustrating an electronic device having an under-display fingerprint sensor.

The electronic device 10 may include a display panel 20, a touch sensor (not shown), and an under-display fingerprint sensor 100. The under-display fingerprint sensor 100 may generate a fingerprint image by picking up the fingerprint of a finger in contact with an upper glass cover 30. The under-display fingerprint sensor 100 may be disposed under the display panel 20 to generate the fingerprint image. Although not shown, a fingerprint sensor layer having the same structure as the under-display fingerprint sensor 100 may be disposed on at least a part or all of a lower surface of the display panel 20, and may generate the fingerprint image at any position. Since the under-display fingerprint sensor 100 and the fingerprint sensor layer may have the same mechanism and structure except that only the area occupied by the lower surface of the display panel 20 and/or the position at which the fingerprint image can be generated are different, hereinafter, the under-display fingerprint sensor 100 will be mainly described.

FIG. 1 illustrates a smartphone having a glass cover 30 attached to the front thereof as an example of the electronic device 10. Upper coating region 32a and lower coating regions 32b defining a region for exposing the display panel 20 may be formed on the lower surface of the glass cover 30. Depending on the type of the electronic device 10, left and right coating regions (not shown) may be connected to both ends of the upper and lower coating regions 32a and 32b, respectively. The display panel 20 occupying a relatively large area and a speaker, a camera, and/or an ambient light sensor occupying a relatively small area may be disposed on the front surface of the electronic device 10. The glass cover 30 may cover the entire display panel 20, or may cover a part or the entire front surface of the electronic device depending on the type of the electronic device. The display panel 20 may be disposed under the glass cover 30, and the under-display fingerprint sensor 100 may be disposed under the display panel 20.

Figure 2A:
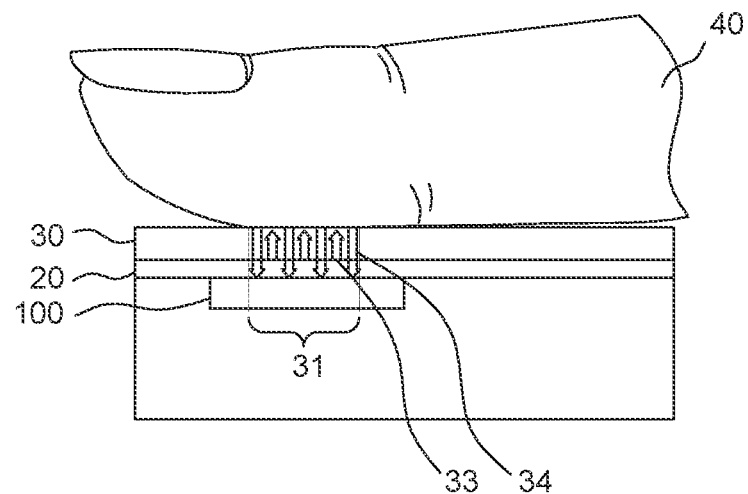
FIG. 2A and FIG. 2B schematically illustrate the concept of generating a fingerprint image using panel light.
Figure 2B:
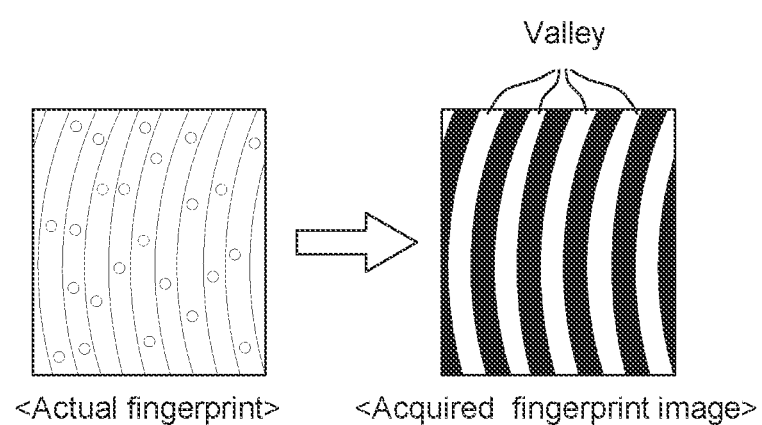

FIG. 2A and FIG. 2B schematically illustrate the concept of generating a fingerprint image using panel light.

Referring to FIG. 2A, the under-display fingerprint sensor 100 may generate a fingerprint image using rays of light generated by the display panel 20 (hereinafter referred to as panel light). At least a portion of rays of panel light 33 may propagate in perpendicular direction toward the glass cover 30. When the ridge of the fingerprint contacts the glass cover 30, the light reaching a contact area of the glass cover 30 and a ridge of the fingerprint may be absorbed by the ridge. On the other hand, the light reaching an area corresponding to a valley of the fingerprint may be reflected toward the display panel 20. The reflected light passes through the display panel 20 and reaches the under-display fingerprint sensor 100. The light reflected at various angles may reach the under-display fingerprint sensor 100 at various angles. The under-display fingerprint sensor 100 generates the fingerprint image by using the panel light 34 that has passed through the display panel 20 perpendicularly among light reflected at various angles. In FIG. 2B, since the light reflected from the area corresponding to the valley of the fingerprint may be detected, the valley of the fingerprint appears relatively bright and the ridge of the fingerprint appears relatively dark in the fingerprint image.

A light source for generating the panel light 34 necessary for generating the fingerprint image may be the display panel 20. The display panel 20 may turn on a combination of G and B pixels to generate the panel light 34 irradiated toward the finger 40. The panel light 34 may be, for example, a visible light, more specifically, a green light or a blue light. In order to remove an influence caused by light in a near-infrared wavelength band, the under-display fingerprint sensor 100 may include an IR cut filter for blocking IR and red light. When the finger 40 may be located on a fingerprint acquisition area 31 on the glass cover 30, G, B or both pixels located below the fingerprint acquisition area 31 and/or G, B or both pixels located other than the fingerprint acquisition area 31 may be turn on.

Figure 3:
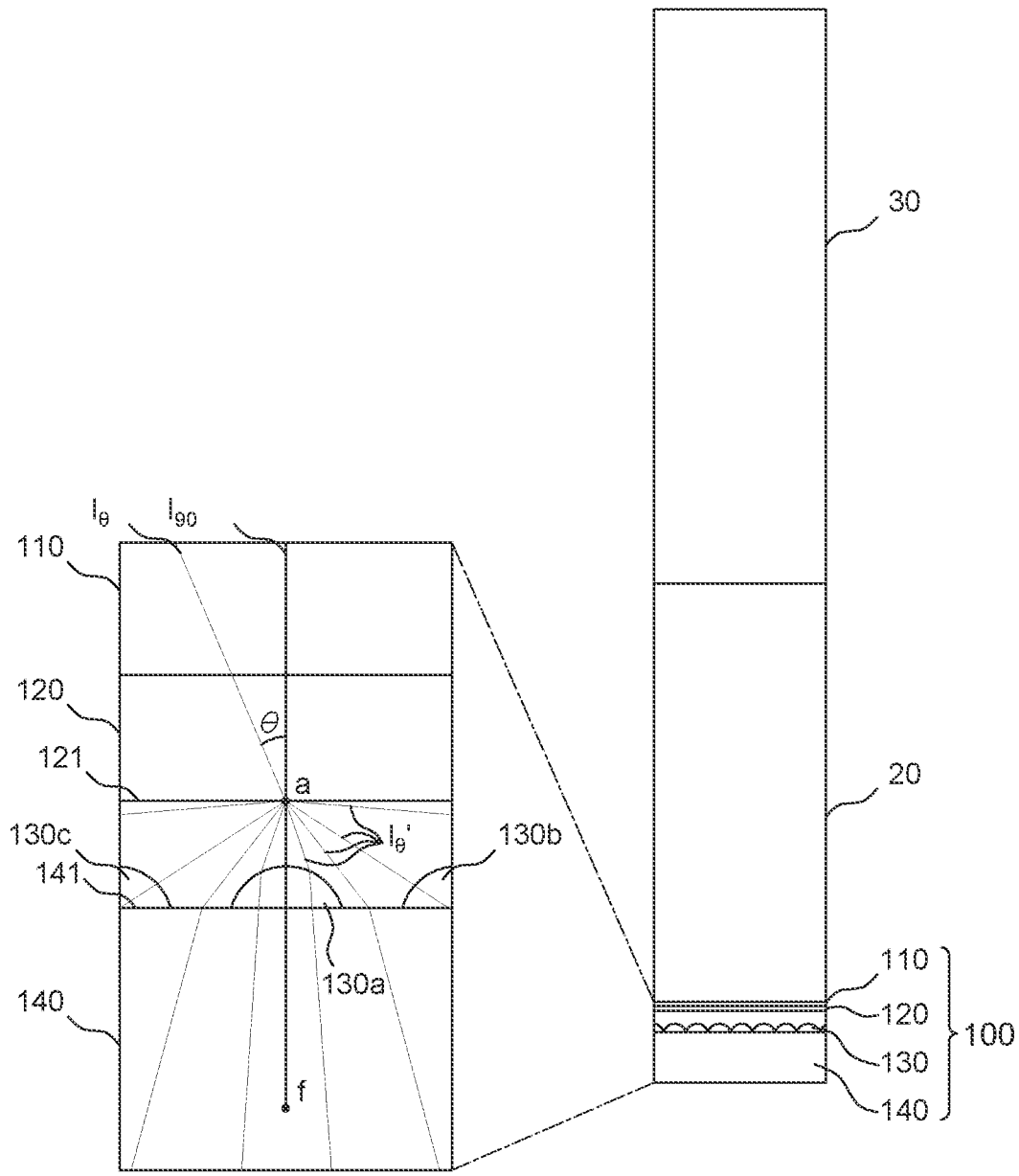
FIG. 3 is a cross-sectional view schematically illustrating a mechanism of the under-display fingerprint sensor.

FIG. 3 is a cross-sectional view schematically illustrating a mechanism of the under-display fingerprint sensor.

Referring to FIG. 3, the under-display fingerprint sensor 100 may include a first sensor retarder 110, a first sensor polarizer 120, a lens 130, and an image sensor 140. The light selection layer may include the first sensor retarder 110 and the first sensor polarizer 120.

The laminated first sensor retarder 110 and the first sensor polarizer 120 may be disposed under the display panel 20. Light emitted from the lower surface of the display panel 20 may pass through the first sensor retarder 110 and the first sensor polarizer 120, and then may be incident on the lens 130. A layer formed of an optically transparent material (hereinafter, transparent layer) may be interposed between the the display panel 20 and the first sensor retarder 110 or between the first sensor retarder 110 and the first sensor polarizer 120 or under the first sensor polarizer 120. Hereinafter, in order to avoid unnecessary confusion, a description of the transparent layer will be omitted. The first sensor polarizer 120 may be spaced apart from the lens 130 disposed thereunder.

A space between the first sensor polarizer 120 and the lens 130 may be filled with, for example, air. Accordingly, the lower surface 121 of the first sensor polarizer 120 may be an interface between two media having different refractive indices. Since the refractive index of air is smaller than the refractive index of the first sensor polarizer 120, the light toward the lower surface 121 in the first sensor polarizer 120 may be refracted at a refraction angle greater than an incidence angle. By the lower surface 121 of the first sensor polarizer 120, light may be refracted by about −90 degrees to about 90 degrees. Light $I_{90}$ having an incidence angle of substantially 90 degrees, namely, perpendicular to the lower surface 121 may not be refracted. In contrast, light $I_\theta$ with an incidence angle less than or greater than 90 degrees to Point a may be refracted at an angle greater than the incidence angle. Light having an incidence angle close to the total reflection angle may be refracted by approximately 90 degrees on the lower surface 121. A portion of rays of refracted light $I_\theta'$ may reach the lens 130, and the remaining portion may reach the upper surface 141 of the image sensor 140 exposed between the lenses 130.

Lens array may include a plurality of lenses 130a, 130b, 130c arranged on the same plane. The lower surfaces of the lenses 130a, 130b, and 130c are substantially flat, and the upper surfaces of the lenses 130a, 130b, and 130c are curved. That is, the horizontal cross-sections of the lenses 130a, 130b, and 130c are circular, and the diameter of the horizontal cross-sections decreases as the distance from the center in the perpendicular direction increases. In the lens array, the lenses 130a, 130b, 130c are arranged to correspond to a light receiving unit of the image sensor 140. In one embodiment, one lens corresponds to one light receiving unit. In another embodiment, one lens may correspond to a plurality of light receiving units.

The lenses 130a, 130b, and 130c may focus the light $I_{90}$ that propagates in substantially perpendicular direction toward the upper surface 141 of image sensor 140 to a focal point f, but refract the light $I_\theta'$ propagating at other angles to a point other than the focal point f. The focal point f may be determined by various factors such as diameter of lens, curvature, etc., and may be located under the center of the lens. In general, CMOS image sensor (CIS) module includes an optical lens for adjusting a focus and a microlens for increasing an amount of light incident on the light receiving unit. The optical lens corresponds to the entire image sensor, and the microlens corresponds to each light receiving unit of the image sensor. The lenses 130a, 130b, and 130c are arranged to correspond to the light receiving unit of the image sensor 140, but their functions are more like the optical lens of CIS module in terms of focusing the incident light to the focus. Conventional function of microlens in CIS module is increasing the light amount by directing light having an incidence angle in a certain range toward the light receiving unit, but the lenses 130a, 130b, and 130c focus only the light $I_{90}$ at the focal point f, and have the light $I_θ'$ to be deviated from the focal point f. The light $I_{90}$ can reach each of light receiving units corresponding to each of the lenses 130a, 130b, and 130c.

By use of the lower surface 121 of the first sensor polarizer 120 and the lens 130, which are the interface between two media having different refractive indices, the image sensor 140 can detect only light $I_{90}$ that propagates in the substantially perpendicular direction toward the upper surface 141 of the image sensor 140. The light $I_{90}$ and the light $I_θ$ may be incident on the same point a on the lower surface 121. The light $I_{90}$ may reach the curved surface of the lens 130a without refraction. In contrast, a portion of rays of the refracted light $I_θ'$ may be refracted to reach the curved surface of the lens 130a, and the remaining portion may reach the curved surface of the other adjacent lenses 130b and 130c. The light $I_{90}$ incident on the curved surface of the lens 130a may be refracted toward the focal point f of the lens 130a irrespective of the incident point. On the other hand, the light $I_θ'$ incident at an angle other than 90 degrees (hereinafter perpendicular) on the curved surface of the lens 130a cannot reach at least the focal point f of the lens 130a. On the other hand, although the light $I_θ'$ incident at an angle other than 90 degrees on the curved surface of the lens 130b varies depending on the incident point and/or the incidence angle, it may reach the focus of another lens located on the right side of the lens 130b, but, cannot reach the focal point f of the lens 130a.

Light incident on a portion of the upper surface 141 of the image sensor 140 in which a lens is not formed (hereinafter, flat surface) may be out of foal point f. The light $I_{90}$ incident perpendicularly to the flat surface may not reach the focal point f because it is not refracted. On the other hand, the light $I_θ$ incident at an angle other than perpendicular to the flat surface may be refracted on the upper surface 141 and may not reach the focal point f. A light path from the upper surface 141 of the image sensor 140 to the light receiving unit may be filled with a material having a refractive index greater than that of air. That is, the upper surface 141 of the image sensor 140 is an interface between two media having different refractive indices. Accordingly, the refraction angle of the light incident toward the image sensor 140 is smaller than the incidence angle. The light $I_θ'$ incident on the flat surface may not reach the focal point f of the lens 130a, but some may reach the focal point of the adjacent lenses 130b and 130c. A structure in which the medium having a different refractive index is interposed between the polarizer 120 and the lens array may be effective in detecting the light propagating in the perpendicular direction, but the light refracted beyond the allowable range may reach the neighboring light receiving unit. Accordingly, hereinafter, embodiments having the structure in which light does not reach the neighboring light receiving unit while using the above-described mechanism will be described.

Hereinafter, throughout the accompanying drawings, a hatched line indicated on the retarder indicates the direction of a slow axis, and a hatched line indicated on the polarizer represents the direction of a polarization axis with respect to the slow axis extending in the horizontal direction. Meanwhile, it is illustrated that both the slow axis of the display retarder and the slow axis of the sensor retarder extend in a horizontal direction, or the slow axis of the display retarder and the slow axis of the sensor retarder extend in a vertical direction. It should be understood that this is merely expressed for ease of understanding, and it is not necessary to align the slow axis of the sensor retarder with the slow axis of the display retarder.

Figure 4:
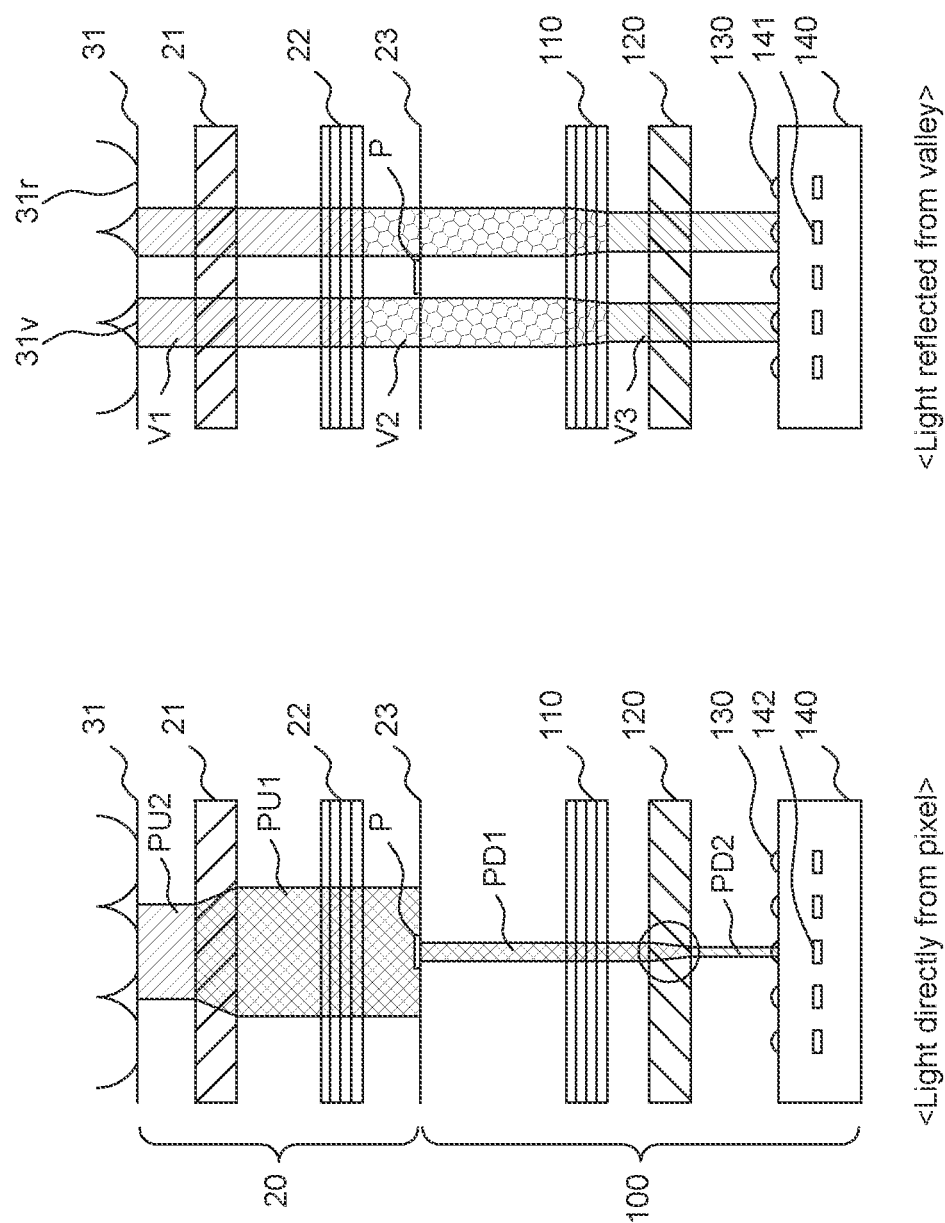
FIG. 4 exemplarily illustrates one baseline structure for increasing a difference between the light emitted from the ridge of the fingerprint and the light emitted from the valley in the under-display fingerprint sensor.

FIG. 4 exemplarily illustrates one baseline structure for increasing a difference between the light emitted from the ridge of the fingerprint and the light emitted from the valley in the under-display fingerprint sensor.

The under-display fingerprint sensor 100 may be disposed under the display panel 20. The display panel 20 may include a display polarizer 21, a display retarder 22 disposed under the display polarizer 21, and a pixel layer 23 having a plurality of pixels P for generating light disposed under the display retarder 22. On the lower surface of the display panel 20, in order to protect the display polarizer 21, the display retarder 22, and the pixel layer 23, a protective layer formed of a non-transparent material, for example, metal or synthetic resin may be disposed. In one embodiment, the under-display fingerprint sensor 100 may be disposed in a region from which a portion of the protective layer is removed (hereinafter, a discrete-type sensor). In another embodiment, the under-display fingerprint sensor 100 may be manufactured in the form of a film and laminated on the lower surface of the display panel 20. The image sensor 140 may be attached to the lower surface of the sensor polarizer 120 to implement an under-display fingerprint sensor (hereinafter, an embedded sensor). Hereinafter, in order to avoid duplication of description, the discrete-type sensor will be mainly described.

The display polarizer 21 and the display retarder 22 improve visibility of the display panel 20. Ambient light incident on the display panel 20 is unpolarized light. When ambient light is incident on the upper surface of the display polarizer 21, only the display linearly-polarized light having a polarization axis substantially coincident with a polarization axis of the display polarizer 21 may pass through the display polarizer 21. When the display linearly-polarized light passes through the display retarder 22, it becomes a display circularly-polarized light (or elliptically-polarized light) rotating in a clockwise or counterclockwise direction. When the display circularly-polarized light is reflected by the pixel layer 23 and is incident back on the display retarder 22, it becomes the reflected linearly-polarized light. If the polarization axis of the display retarder 22 is inclined by about 45 degrees with respect to the slow axis, the polarization axis of the display linearly-polarized light and the polarization axis of the reflected linearly-polarized light are orthogonal to each other. Due to this, the reflected linearly-polarized light, that is, ambient light reflected by the pixel layer 23 may be attenuated by the display polarizer 21 to prevent it from going out of the display. Accordingly, visibility of the display panel 20 may be improved.

Referring to FIG. 4, the under-display fingerprint sensor 100 may include a first sensor retarder 110, a first sensor polarizer 120, a lens 130, and an image sensor 140. The light selection layer may include the first sensor retarder 110 and the first sensor polarizer 120. The first sensor retarder 110 is disposed on the first sensor polarizer 120, and the image sensor 140 is disposed under the first sensor polarizer 120. A polarization axis of the first sensor polarizer 120 may be inclined at a first angle, for example, +45 degrees with respect to the slow axis of the first sensor retarder 110. The first sensor polarizer 120 may be spaced apart from the lens 130, and for example, air may be interposed therebetween.

In one embodiment, the first sensor retarder 110 may be stacked on the first sensor polarizer 120. The stacked first sensor retarder 110 and the first sensor polarizer 120 may be attached to the lower surface of the display panel 20. In another embodiment, the image sensor 140 may be implemented using a thin film transistor. For this reason, the under-display fingerprint sensor 100 may be manufactured by laminating the first sensor retarder 110, the first sensor polarizer 120, and the image sensor 140, all in the form of a film.

The lens 130 may be disposed on the image sensor 140. The lens 130 may focus the substantially perpendicularly propagating light $I_{90}$ which is at least a portion of a plurality of rays of a downward linearly-polarized light V3 and a sensor linearly-polarized light PD2 to the first light receiving unit 141 and the second light receiving unit 142 of the image sensor 140. In addition, the lens 130 may refract the light $I_\theta$ propagating in an inclined direction (hereinafter inclined light) in the downward linearly-polarized light V3 and the sensor linearly-polarized light PD2 to be deviated from the first light receiving unit 141 and the second light receiving unit 142. That is, one lens 130 may be disposed over one light receiving unit. Hereinafter, unless otherwise specified, light incident on the first light receiving unit 141 and the second light receiving unit 142 is the light $I_{90}$ propagating in the perpendicular direction.

The image sensor 140 may include the first light receiving unit 141 and the second light receiving unit 142. The first light receiving unit 141 may detect the downward linearly-polarized light V3 and the sensor linearly-polarized light PD2 emitted from the sensor polarizer 120, and the second light receiving unit 142 may detect the sensor linearly-polarized light PD2. The downward linearly-polarized light V3 and the sensor linearly-polarized light PD2 are converted by the first light receiving unit 141 into a pixel current corresponding to the amount of received light, and the sensor linearly-polarized light PD2 is converted by the second light receiving unit 142 to a pixel current corresponding to the amount of the received light. The light receiving unit 141 or 142 may include, for example, one photodiode or a plurality of photodiodes (hereinafter referred to as a PD array). In one embodiment, one or two photodiodes may correspond to one pixel P. In another embodiment, the PD array may correspond to one pixel P. In still another embodiment, one or two photodiodes may correspond to a plurality of pixels P. In still another embodiment, the PD array may correspond to a plurality of pixels P. The first and second light receiving units 141 and 142 may detect any one of light belonging to different wavelength bands, such as green and blue, in common.

Hereinafter, the operation of the above-described under-display fingerprint sensor 100 will be described.

When being used with the display panel 20 having the display polarizer 21 and the display retarder 22, a contrast of the fingerprint image generated by the under-display fingerprint sensor 100 may be improved. The first sensor retarder 110 and the first sensor polarizer 120 may act differently depending on the characteristics of incident light, for example, a type (non-polarization, rotational polarization, linearly-polarized light), a direction of axis (slow axis/fast axis, polarization axis) and so on. For example, light having one characteristic may pass through the first sensor retarder 110 and the first sensor polarizer 120 without substantially losing the amount of light. On the other hand, light having another characteristic may pass through the first sensor retarder 110 and the first sensor polarizer 120 while the significant amount of light is lost. At least some of the characteristics of the light incident on the first sensor retarder 110 and the first sensor polarizer 120 may be determined by the display polarizer 21 and the display retarder 22.

The light incident on the under-display fingerprint sensor 100 may be light generated by the pixel P. In detail, most of the unpolarized light generated by the pixel P may propagate upwardly and the rest may propagate downwardly.

An unpolarized light PD1 propagating downwardly may pass through the first sensor retarder 110 and the first sensor polarizer 120 to become the sensor linearly-polarized light PD2. An unpolarized light PU1 propagating upwardly may pass through the display retarder 22 substantially without loss and then pass through the display polarizer 21 to become a upward linearly-polarized light PU2. The upward linearly-polarized light PU2 may be reflected from the fingerprint acquisition area 31 on the glass cover 30 and propagate toward the lower surface of the display panel 20. In the fingerprint acquisition region 31, the upward linearly-polarized light PU2 reaching the region 31$r$ in contact with the ridge of the fingerprint is mostly absorbed by the ridge and is hardly reflected, but the upward linearly-polarized PU2 reaching the region 31$v$ below the valley of the fingerprint is substantially reflected and propagates toward the lower surface of the display panel 20. Hereinafter, the upward linearly-polarized light PU2 reflected from the region 31$v$ below the valley of the fingerprint will be referred to as downward linearly-polarized V1.

Since a polarization axis of the downward linearly-polarized light V1 substantially coincides with a polarization axis of the display polarizer 21, the downward linearly-polarized light V1 may pass through the display polarizer 21 substantially losslessly. The display polarizer 21 may have a polarization axis inclined at a second angle, for example, −45 degrees with respect to the slow axis of the display retarder 22. Accordingly, the downward linearly-polarized light V1 passing through the display polarizer 21 may be incident at a second angle with respect to the slow axis of the display retarder 22. When a first polarization element of the downward linearly-polarized light V1 projected along the fast axis and a second polarization element of the downward linearly-polarized light V1 projected along the slow axis pass through the display retarder 22, a phase difference of $\lambda/4$ occurs between them. Due to this, the downward linearly-polarized light V1 passing through the display retarder 22 may become the downward circularly-polarized light V2 rotating in the counterclockwise direction. The downward circularly-polarized light V2 is incident on the under-display fingerprint sensor 100 through the lower surface of the display panel 20.

The downward circularly-polarized light V2 and the unpolarized light PD1 may be incident on the upper surface of the first sensor retarder 110. The downward circularly-polarized light V2 originates from the downward linearly-polarized light V1 that has passed through the display polarizer 21 and the display retarder 22, and the unpolarized light PD1 is the light that propagates downwardly from the pixel P toward the under-display fingerprint sensor 100. The downward circularly-polarized light V2 having a phase difference of $\lambda/4$ between the fast axis and the slow axis becomes the downward linearly-polarized light V3 by the first sensor retarder 110. In detail, after the phase difference of $\lambda/4$ is added by the first sensor retarder 110, the downward circularly-polarized light V2 having the phase difference of $\lambda/4$ between the first polarization element and the second polarization element may become the downward linearly-polarized light V3 of which polarization axis is substantially orthogonal to the polarization axis of the downward linearly-polarized light V1. Meanwhile, the unpolarized light PD1 may pass through the first sensor retarder 110 substantially losslessly.

While passing through the first sensor polarizer 120, the light amount of the downward linearly-polarized light V3 does not change substantially, but the light amount of the unpolarized light PD1 decreases significantly. Since the downward linearly-polarized light V3 has the polarization axis substantially parallel to the polarization axis of the first sensor polarizer 120, it may pass through the first sensor polarizer 120 substantially without loss. On the other hand, since the unpolarized light PD1 is a set of a plurality of rays of light having various characteristics, only light substantially parallel to the polarization axis of the first sensor polarizer 120 may pass through the first sensor polarizer 120. Accordingly, the light amount of the sensor linearly-polarized light PD2 is relatively small compared to the light amount of the unpolarized light PD1.

The under-display fingerprint sensor 100 is a device for generating a fingerprint image by detecting light reflected from the region 31v below the valley of the fingerprint. Pixel P of the display panel 20 may emit not only light to be reflected from the fingerprint acquisition area 31 but also light to be directly incident on the under-display fingerprint sensor 100. This is because the under-display fingerprint sensor 100 is disposed under the display panel. For this reason, the image sensor 140 in the under-display fingerprint sensor 100 may receive both the light reflected due to the valley of the fingerprint and the directly incident light. In particular, since light reflected from the region 31r in contact with the ridges of the fingerprint does not substantially exist, the light receiving unit corresponding to the ridges of the fingerprint should not generate a pixel current according to an amount of detected light. However, due to the light directly incident without being reflected by the fingerprint acquisition area 31, the light receiving unit corresponding to the ridge of the fingerprint may generate an unignorable amount of pixel current. As described above, the first sensor retarder 110 and the first sensor polarizer 120 substantially reduce the light amount of the sensor linearly-polarized light PD2 while substantially maintaining the light amount of the downward linearly-polarized light V3. Accordingly, the contrast of the generated fingerprint image may be increased.

Hereinafter, embodiments in which various structures for improving the contrast of the fingerprint image are implemented will be described.

Figure 5A:
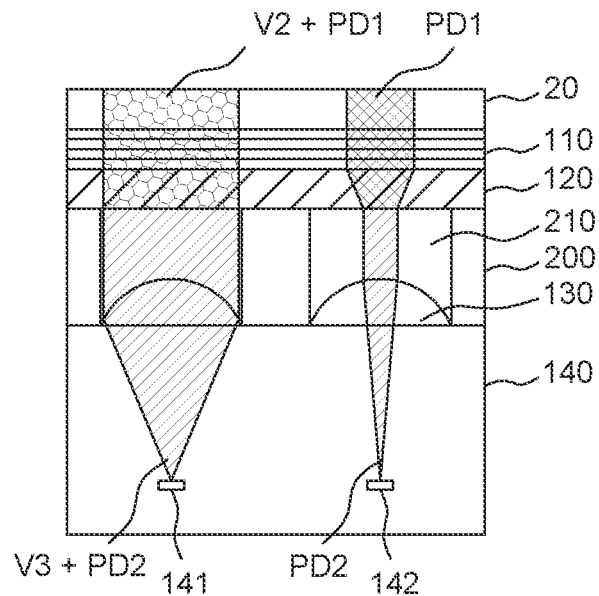
FIG. 5A, FIG. 5B and FIG. 5C exemplarily illustrate embodiments of the under-display fingerprint sensor that generates a fingerprint image having an improved contrast ratio.
Figure 5B:
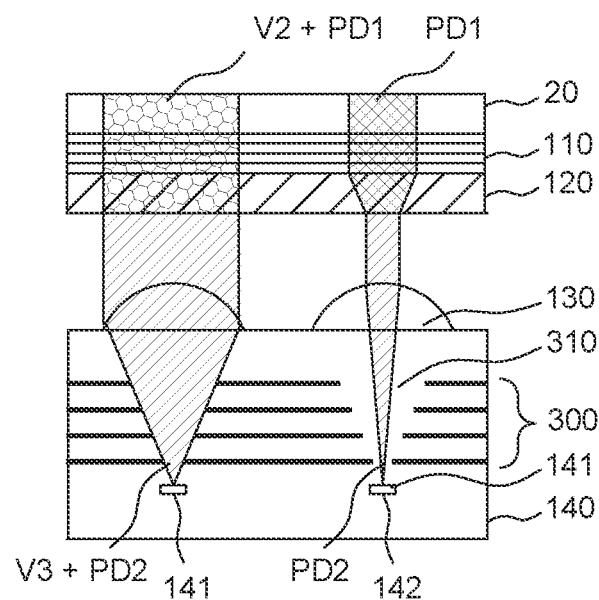
Figure 5C:
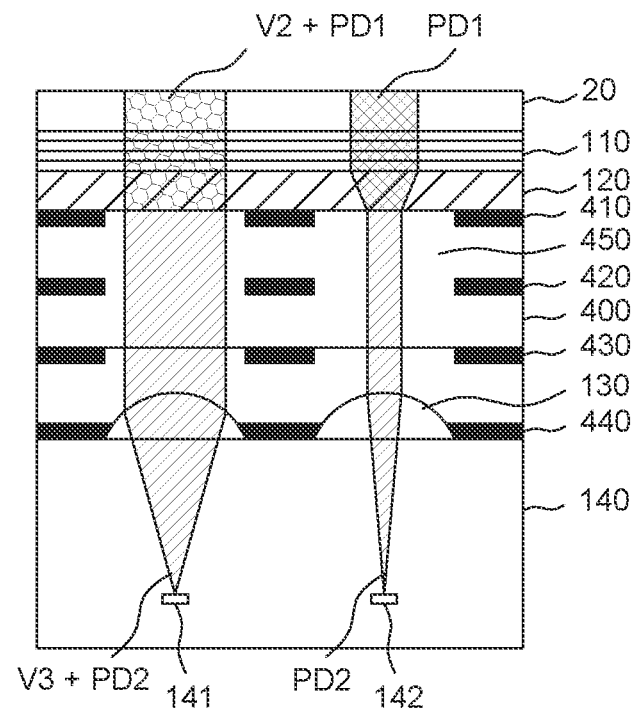

FIG. 5A, FIG. 5B and FIG. 5C exemplarily illustrate embodiments of the under-display fingerprint sensor that generates a fingerprint image having an improved contrast ratio. The light selection layer may include the first sensor retarder 110 and the first sensor polarizer 120.

Referring to FIG. 5A, the under-display fingerprint sensor may include the first sensor retarder 110 and the first sensor polarizer 120 interposed between the display panel 20 and an inclined light blocking structure 200.

The under-display fingerprint sensor may include the inclined light blocking structure 200 interposed between the first sensor polarizer 120 and the image sensor 140. The inclined light blocking structure 200 may be formed of, for example, a light absorbing material that does not pass light therein, and may have a plurality of through holes 210 extending substantially vertically from an upper surface to a lower surface thereof. The plurality of through-holes 210 may be formed at positions corresponding to the lenses 130, and a cross-section of the through-holes 210 may be, for example, a circular shape, but is not limited thereto. When the cross section is circular, the diameter of the through hole 210 is substantially the same as or greater than the diameter of the lens 130. That is, when the inclined light blocking structure 200 is disposed on the upper surface of the image sensor 140, one lens 130 may be accommodated in one through hole 210.

The unpolarized light PD1 emitted from the lower surface of the display panel 20 may become the sensor linearly-polarized light PD2 in which the amount of light decreases while passing through the first sensor polarizer 120. On the other hand, the downward circularly-polarized light V2 emitted from the lower surface of the display panel 20 may pass through the first sensor retarder 110 and the first sensor polarizer 120 substantially without loss to become the downward linearly-polarized light V3.

In detail, the sensor linearly-polarized light PD2 and the downward linearly-polarized light V3 that propagate in the substantially perpendicular direction toward the through hole 210 may reach the curved surface of the lens 130 without refraction. The sensor linearly-polarized light PD2 and the downward linearly-polarized light V3 incident at an angle other than perpendicular to the through hole 210 may be refracted on the lower surface of the display panel 20. A portion of rays of the refracted sensor linearly-polarized light PD2 and the refracted downward linearly-polarized light V3 may be blocked by an inner lateral surface of the through hole 210. The remaining portion of rays of the refracted sensor linearly-polarized light PD2 and the refracted downward linearly-polarized light V3 that are not blocked by the inner lateral surface of the through hole 210 but propagate in inclined directions may be incident on the curved surface of the lens 130. The refracted sensor linearly-polarized light PD2 and the refracted downward linearly-polarized light V3 incident on the curved surface of the lens 130 may be refracted into the image sensor 140, but do not reach the focal point f of the lens 140. The light receiving units 141 and 142 are disposed at the focal points f of the lenses 130 respectively. The sensor linearly-polarized light PD2 and the downward linearly-polarized light V3 that propagate perpendicularly or at an angle other than perpendicular and are incident on a region other than the through hole 210 may be blocked by the upper surface of the inclined light blocking structure 200 and do not propagate toward the lens 130.

The light incident on the first light receiving unit 141 may be the downward linearly-polarized light V3 and the sensor linearly-polarized light PD2, and the light incident on the second light receiving unit 142 may be the sensor linearly-polarized light PD2. In terms of the light amount, the downward linearly-polarized light V3 and the downward circularly-polarized light V2 are substantially the same, but the sensor linearly-polarized light PD2 becomes relatively smaller than the unpolarized light PD1. Accordingly, a ratio of the first pixel current generated by the first light receiving unit 141 to the second pixel current generated by the second light receiving unit 142 is relatively increased compared to a sensor without the first sensor retarder 110 and the first sensor polarizer 120. This may increase the contrast ratio of the fingerprint image generated using the first pixel current and the second pixel current.

Referring to FIG. 5B, the under-display fingerprint sensor may include an inclined light blocking structure 300 formed inside the image sensor 140. The inclined light blocking structure 300 may be interposed between the lens array and the light receiving units 141 and 142. The inclined light blocking structure 300 may include a plurality of layers formed of, for example, the light absorbing material that does not pass light therein. The inclined light blocking structure 300 may define a light path 310 through which the sensor linearly-polarized light PD2 and the downward linearly-polarized light V3 in the perpendicular direction are focused by the lens 130 to reach the light receiving units 141 and 142. To this end, in each layer, an opening may be formed at a position corresponding to the light path 310. The opening may be, for example, circular, and the diameter of the opening formed in each layer along the light path 310 may be different. For example, the diameter of the opening formed in the layer closest to the lens 130 may be the largest, and the diameter of the opening may be decreased as it approaches the light receiving units 141 and 142.

The unpolarized light PD1 emitted from the lower surface of the display panel 20 becomes the sensor linearly-polarized light PD2 in which the light amount decreases while passing through the first sensor polarizer 120. On the other hand, the downward circularly-polarized light V2 emitted from the lower surface of the display panel 20 passes through the first sensor retarder 110 and the first sensor polarizer 120 substantially without loss to become the downward linearly-polarized light V3.

The light path 310 defined by the plurality of openings may block the sensor linearly-polarized light PD2 and downwardly linearly polarized V3, both refracted by the lens 130. When considering the cross-section, the sensor linearly-polarized light PD2 and the downward linearly-polarized light V3 in the perpendicular direction may pass through an inverted triangular light path 310 only when properly refracted by the lens 130, namely, focused toward the focal point f. The sensor linearly-polarized light PD2 and the downward linearly-polarized light V3 propagating at an angle other than perpendicular may be blocked by any one of layers defining the light path 310 and do not reach the light receiving units 141 and 142.

The light incident on the first light receiving unit 141 may be the downward linearly-polarized light V3 and the sensor linearly-polarized light PD2, and the light incident on the second light receiving unit 142 may be the sensor linearly-polarized light PD2. In terms of the light amount, the downward linearly-polarized light V3 and the downward circularly-polarized light V2 are substantially the same, but the sensor linearly-polarized light PD2 becomes relatively smaller than the unpolarized light PD1. Accordingly, the ratio of the first pixel current generated by the first light receiving unit 141 to the second pixel current generated by the second light receiving unit 142 may be relatively increased compared to the structure without the first sensor retarder 110 and the first sensor polarizer 120. This may increase the contrast ratio of the fingerprint image generated using the first pixel current and the second pixel current.

Referring to FIG. 5C, the under-display fingerprint sensor may include the first sensor retarder 110, the first sensor polarizer 120, an inclined light blocking structure 400, the lens 130, and the image sensor 140. The unpolarized light PD1 and the downward circularly-polarized light V2 emitted from the display panel 20 may pass through the first sensor retarder 110 and the first sensor polarized layer 120 to become the sensor linearly-polarized light PD2 and the downwardly linearly circularly-polarized light V3.

The lower surface of the inclined light blocking structure 400 may be spaced apart from the lens 130. The inclined light blocking structure 400 may be formed of an optically transparent material and include a plurality of layers 410, 420, and 430 formed of the light absorbing material. The first layer 410 may be formed in contact with or close to the lower surface of the first sensor polarizer 120, the second layer 420 may be disposed inside the inclined light blocking structure 400 to be disposed under the first layer 410, and the third layer 430 may be formed inside the inclined light blocking structure 400 to be on or close to the lower surface of the inclined light blocking structure 400. The first to third layers 410, 420, 430 may define a light path 450 through which the downward linearly-polarized light V3 and the sensor linearly-polarized light PD2 that propagate in the perpendicular direction can pass.

To this end, in the first to third layers 410, 420, and 430, openings may be formed at positions corresponding to the light paths 450. The opening may be, for example, circular, and its diameter may be substantially equal to or smaller than the diameter of the lens 130. Additionally, a light blocking layer 440 may be formed on the flat surface between the lenses 130. The light blocking layer 440 may be formed of the light absorbing material.

The downward linearly-polarized light V3 and the sensor linearly-polarized light PD2 that propagate in the substantially perpendicular direction toward the light path 450 may reach the curved surface of the lens 130 without refraction. On the other hand, the downward linearly-polarized light V3 and the sensor linearly-polarized light PD2 incident at an angle other than perpendicular toward the light path 450 may be blocked by the first to third layers 410, 420 and 430 of the inclined light blocking structure 400. The downward linearly-polarized light V3 and the sensor linearly-polarized light PD2 that are not blocked by the first to third layers 410, 420 and 430 may be blocked by the light blocking layer 440 and cannot enter the image sensor 140. On the other hand, the downward linearly-polarized light V3 and the sensor linearly-polarized light PD2 that propagate at an angle other than perpendicular and are incident on the curved surface of the lens may be refracted into the image sensor 140, but do not reach the focal point f of the lens 140. The light receiving units 141 and 142 are arranged at the focal point f of the lens. The downward linearly-polarized light V3 and the sensor linearly-polarized light PD2 incident on any regions other than the light path 450 may be blocked by the upper surface of the inclined light blocking structure 400 and do not reach the lens 130.

Figure 6A:
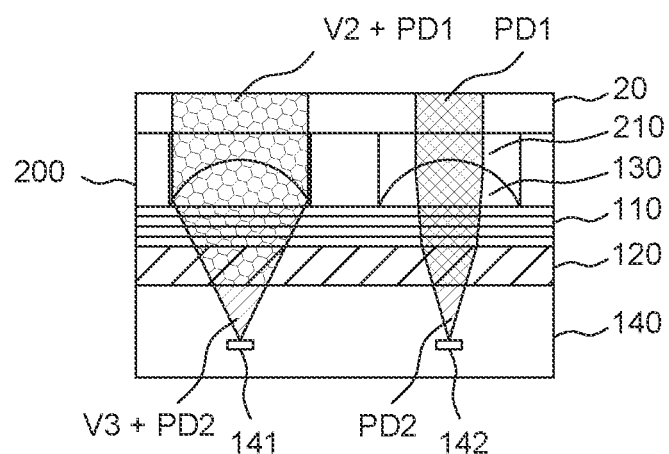
FIG. 6A and FIG. 6B exemplarily illustrate another embodiments of the under-display fingerprint sensor that generates a fingerprint image having an improved contrast ratio.
Figure 6B:
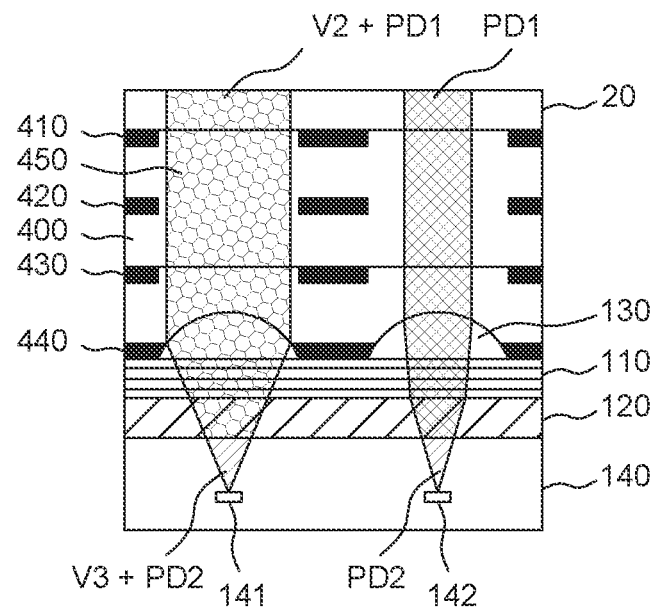

FIG. 6A and FIG. 6B exemplarily illustrate another embodiments of the under-display fingerprint sensor that generates a fingerprint image having an improved contrast ratio.

Referring to FIG. 6A, the under-display fingerprint sensor is disposed under the display panel 20. The under-display fingerprint sensor may include the inclined light blocking structure 200, the lens 130, the first sensor retarder 110, the first sensor polarizer 120, and the image sensor 140. The light selection layer may include the first sensor retarder 110 and the first sensor polarizer 120. The inclined light blocking structure 200 may be interposed between the display panel 20 and the first sensor leader layer 110. The inclined light blocking structure 200 may be formed of, for example, the light absorbing material that does not pass light therein, and have the plurality of through holes 210 extending substantially vertically from the upper surface to the lower surface. The plurality of through-holes 210 may be formed at positions corresponding to the lenses 130 respectively, and the cross-section of the through-holes 210 may be, for example, the circular shape, but is not limited thereto. When the cross section is circular, the diameter of the through hole 210 may be substantially the same as or greater than the diameter of the lens. That is, when the inclined light blocking structure 200 is disposed on the upper surface of the image sensor 140, one lens 130 may be accommodated in one through hole 210.

The unpolarized light PD1 and the downward linearly-polarized light V2 that propagate in the substantially perpendicular direction toward the through hole 210 may reach the curved surface of the lens 130 without refraction. Meanwhile, the unpolarized light PD1 and the downward linearly-polarized light V2 incident at an angle other than perpendicular to the through hole 210 may be refracted on the lower surface of the display panel 20. The refracted unpolarized light PD1 and the refracted downward linearly-polarized light V2 may be blocked by the inner lateral surface of the through hole 210. The refracted unpolarized light PD1 and the refracted downward linearly-polarized light V2 that are not blocked by the inner lateral surface of the through hole 210 may be incident on the curved surface of the lens 130.

The lens 130 may be spaced apart from the lower surface of the display panel 20 by the inclined light blocking structure 200, and for example, air may be interposed therebetween. The lens 130 may focus the substantially perpendicularly propagating light $I_{90}$ which is at least the portion of the plurality of rays of the unpolarized light PD1 and the downward linearly-polarized light V2 to the first light receiving unit 141 and the second light receiving unit 142 of the image sensor 140. In addition, the lens 130 may refract the inclined light $I_\theta$ in the downward circularly-polarized light V2 and the unpolarized light PD1 to be deviated from the first light receiving unit 141 and the second light receiving unit 142. That is, one lens 130 may be disposed over one light receiving unit. Accordingly, there may be a plurality of lenses 130.

In detail, the unpolarized light PD1 and the downward linearly-polarized light V2 that propagate at an angle other than perpendicular and are incident on the curved surface of the lens 130 may pass through the first sensor leader layer 110 and the first sensor polarizer 120 and be refracted into the image sensor 140, but can not reach the focal point f of the lens 130. The light receiving units 141 and 142 are disposed at the focal point f of the lens 130. The unpolarized light PD1 and the downward linearly-polarized light V2 that propagate perpendicularly or at an angle other than perpendicular and are incident on a region other than the through hole 210 may be blocked by the upper surface of the inclined light blocking structure 200 and do not propagate toward the lens 130.

The first sensor retarder 110 and the first sensor polarizer 120 may be disposed under the lens 130. The unpolarized light PD1 refracted toward the light receiving units 141 and 142 by the lens 130 becomes the sensor linearly-polarized light PD2 in which the light amount decreases while passing through the first sensor polarizer 120. On the other hand, the downward circularly-polarized light V2 refracted toward the light receiving units 141 and 142 by the lens 130 passes through the first sensor retarder 110 and the first sensor polarizer 120 substantially without loss and becomes the downward linearly-polarized light V3. The light incident on the first light receiving unit 141 is the downward linearly-polarized light V3 and the sensor linearly-polarized light PD2, and the light incident on the second light receiving unit 142 is the sensor linearly-polarized light PD2. In terms of the light amount, the downward linearly-polarized light V3 and the downward circularly-polarized light V2 are substantially the same, but the sensor linearly-polarized light PD2 becomes relatively smaller than the unpolarized light PD1. Accordingly, the ratio of the first pixel current generated by the first light receiving unit 141 to the second pixel current generated by the second light receiving unit 142 may be relatively increased compared to the structure without the first sensor retarder 110 and the first sensor polarizer 120. This may increase the contrast ratio of the fingerprint image generated using the first pixel current and the second pixel current.

Referring to FIG. 6B, the under-display fingerprint sensor may include an inclined light blocking structure 400 disposed on the lower surface of the display panel 20, the lens 130 disposed under the inclined light blocking structure 400, the first sensor retarder 110 disposed under the lens 130, the first sensor polarizer 120 disposed on the lower surface of the first sensor retarder 110, and the image sensor 140 disposed under the first sensor polarizer 120.

The lower surface of the inclined light blocking structure 400 may be spaced apart from the lens 130. The inclined light blocking structure 400 may be formed of the optically transparent material and may include a plurality of layers 410, 420, and 430 formed of the light absorbing material. The first layer 410 may be formed in contact with or close to the lower surface of the display panel 20, the second layer 420 may be disposed inside the inclined light blocking structure 400 to be disposed under the first layer 410, and the third layer 430 may be formed inside the inclined light blocking structure 400 to be disposed on or close to the lower surface of the inclined light blocking structure 400. The first to third layers 410, 420, 430 may define a light path 450 through which the downward circularly-polarized light V2 and unpolarized light PD1 that propagate in the perpendicular direction can pass.

To this end, in the first to third layers 410, 420, and 430, openings may be formed at positions corresponding to the light paths 450. The opening may be, for example, circular, and its diameter may be substantially equal to or smaller than the diameter of the lens 130. Additionally, the light blocking layer 440 may be formed on the flat surface between the lenses 130. The light blocking layer 440 may be formed of the light absorbing material.

The downward circularly-polarized light V2 and the unpolarized light PD1 that propagate in the substantially perpendicular direction from the lower surface of the display panel 20 toward the light path 450 may reach the curved surface of the lens 130 without refraction. On the other hand, the downward circularly-polarized light V2 and the unpolarized light PD1 incident at an angle other than perpendicular to the light path 450 may be blocked by the first to third layers 410, 420, 430 of the inclined light blocking structure 400. The remaining portions of the downward circularly-polarized light V2 and the unpolarized light PD1 that are not blocked by the first to third layers 410, 420 and 430 may be blocked by the light blocking layer 440 and cannot enter the image sensor 140. On the other hand, the downward circularly-polarized light V2 and the unpolarized light PD1 that propagate at an angle other than perpendicular and are incident on the curved surface of the lens may be refracted toward the image sensor 140 and then pass through the first sensor retarder 110 and the first sensor polarizer 120, but do not reach the focal point f of the lens 140. The light receiving units 141 and 142 are arranged at the focal point f of the lens. The downward linearly-polarized light V3 and the sensor linearly-polarized light PD2 incident to any regions other than the light path 450 may be blocked by the upper surface of the inclined light blocking structure 400 and do not reach the lens 130.

The first sensor retarder 110 and the first sensor polarizer 120 are disposed under the lens 130. The unpolarized light PD1 refracted toward the light receiving units 141 and 142 by the lens 130 becomes the sensor linearly-polarized light PD2 in which the light amount decreases while passing through the first sensor polarizer 120. On the other hand, the downward circularly-polarized light V2 refracted toward the light receiving units 141 and 142 by the lens 130 passes through the first sensor retarder 110 and the first sensor polarizer 120 substantially without loss and becomes the downward linearly-polarized light V3. The light incident on the first light receiving unit 141 is the downward linearly-polarized light V3 and the sensor linearly-polarized light PD2, and the light incident on the second light receiving unit 142 is the sensor linearly-polarized light PD2. In terms of the light amount, the downward linearly-polarized light V3 and the downward circularly-polarized light V2 are substantially the same, but the sensor linearly-polarized light PD2 becomes relatively smaller than the unpolarized light PD1. Accordingly, the ratio of the first pixel current generated by the first light receiving unit 141 to the second pixel current generated by the second light receiving unit 142 is relatively increased compared to the structure without the first sensor retarder 110 and the first sensor polarizer 120. This may increase the contrast ratio of the fingerprint image generated using the first pixel current and the second pixel current.

Figure 7A:
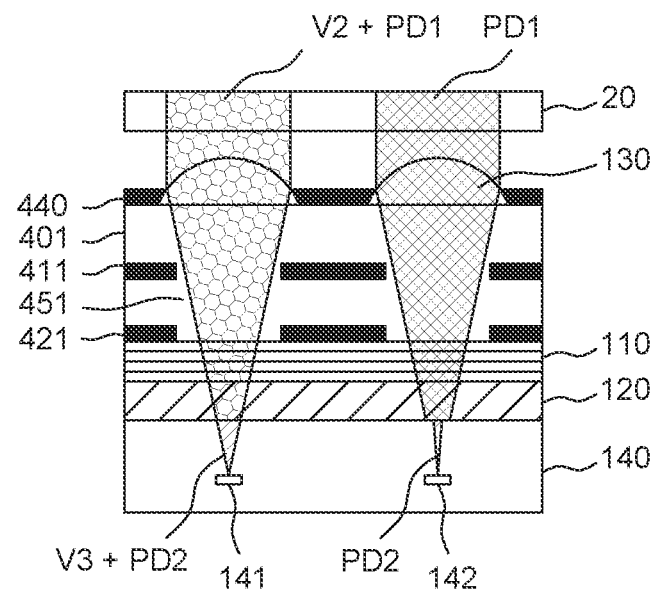
FIG. 7A and FIG. 7B exemplarily illustrate still another embodiments of the under-display fingerprint sensor that generates a fingerprint image having an improved contrast ratio.
Figure 7B:
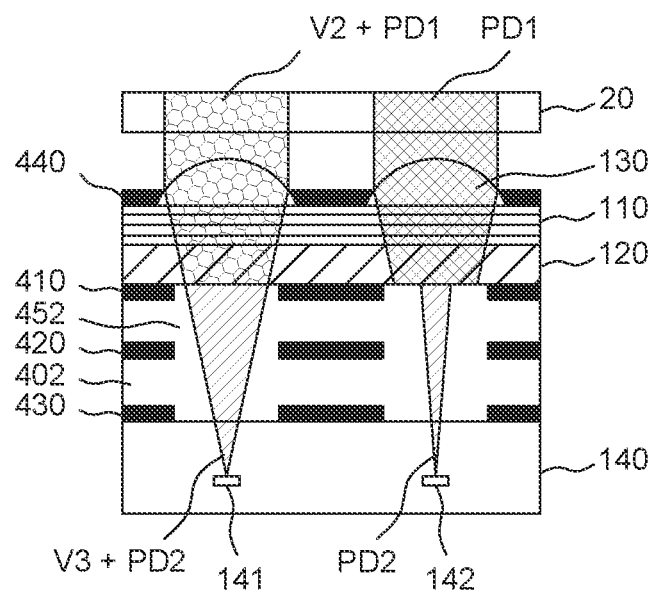

FIG. 7A and FIG. 7B exemplarily illustrate still another embodiments of the under-display fingerprint sensor that generates a fingerprint image having an improved contrast ratio.

Referring to FIG. 7A, the under-display fingerprint sensor may include the lens 130, an inclined light blocking structure 401, the first sensor retarder 110, the first sensor polarizer 120, and the image sensor 140. The lens 130 is spaced apart from the lower surface of the display panel 20.

The inclined light blocking structure 401 may be formed of the optically transparent material and may include a plurality of layers 411 and 421 formed of the light absorbing material. The first layer 411 may be formed inside the inclined light blocking structure 401, and the second layer 421 may be formed inside the inclined light blocking structure 401 to be disposed on or close to the lower surface of the inclined light blocking structure 401. The first to second layers 411 and 421 may define a light path 451 through which light propagating toward the light receiving units 141 and 142 by the lens 130 can pass. To this end, in the first to second layers 411 and 421, openings may be formed at positions corresponding to the light paths 451. The opening may be, for example, circular, and its diameter may be substantially equal to or smaller than the diameter of the lens 130. Additionally, the light blocking layer 440 may be formed on the flat surface between the lenses 130. The light blocking layer 440 may be formed of a light absorbing material. The first sensor retarder 110 may be disposed under the inclined light blocking structure 401, and the first sensor polarizer 120 may be disposed under the first sensor retarder 110.

The downward circularly-polarized light V2 and the unpolarized light PD1 that propagate in the substantially perpendicular direction toward the lower surface of the display panel 20 may reach the curved surface of the lens 130 without refraction. On the other hand, the downward circularly-polarized light V2 and the unpolarized light PD1 incident at an angle other than perpendicular to the lower surface of the display panel 20 may be refracted to reach the curved surface of the lens 130 or blocked by the light blocking layer 440.

The downward circularly-polarized light V2 and the unpolarized light PD1 that propagate in the substantially perpendicular direction to reach the curved surface of the lens 130 may be focused and refracted by the lens 130 toward the light receiving units 141 and 142. The refracted downward circularly-polarized light V2 and the refracted unpolarized light PD1 may pass through the light path 451 to reach the first sensor retarder 110. On the other hand, the downward circularly-polarized light V2 and the unpolarized light PD1 that propagate at an angle other than perpendicular and are incident on the curved surface of the lens 130 may be refracted by the lens 130, and can be blocked by the first to second layers 411 forming the light path 451. The refracted downward circularly-polarized light V2 and the refracted unpolarized light PD1, which are not blocked by the first to second layers 411 and 421, may pass through the light path 451, but be deviated from the receiving units 141 and 142.

The refracted downward circularly-polarized light V2 and unpolarized light PD1 reach the first sensor retarder 110. The refracted downward circularly-polarized light V2 passes through the first sensor retarder 110 and the first sensor polarizer 120 substantially losslessly to become the downward linearly-polarized light V3. On the other hand, the refracted unpolarized light PD1 becomes the sensor linearly-polarized light PD2 in which the light amount decreases while passing through the first sensor polarizer 120. The light incident on the first light receiving unit 141 is the downward linearly-polarized light V3 and the sensor linearly-polarized light PD2, and the light incident on the second light receiving unit 142 is the sensor linearly-polarized light PD2. In terms of the light amount, the downward linearly-polarized light V3 and the downward circularly-polarized light V2 are substantially the same, but the sensor linearly-polarized light PD2 becomes relatively smaller than the unpolarized light PD1. Accordingly, the ratio of the first pixel current generated by the first light receiving unit 141 to the second pixel current generated by the second light receiving unit 142 is relatively increased compared to the structure without the first sensor retarder 110 and the first sensor polarizer 120. This may increase the contrast ratio of the fingerprint image generated using the first pixel current and the second pixel current.

Referring to FIG. 7B, the under-display fingerprint sensor may include the lens 130, the first sensor retarder 110, the first sensor polarizer 120, an inclined light blocking structure 402, and the image sensor 140. The lens 130 may be spaced apart from the lower surface of the display panel 20. The first sensor retarder 110 and the first sensor polarizer 120 may be disposed under the lens 130. The inclined light blocking structure 402 may be disposed under the first sensor polarizer 120. The inclined light blocking structure 402 may be formed of the optically transparent material, and may include a plurality of layers 410, 420, and 430 formed of the light absorbing material. The first layer 410 may be formed in contact with or close to the lower surface of the light selection layer, that is, the lower surface of the first sensor polarizer, and the second layer 420 may be disposed under the first layer 410, the second layer 420 may be disposed inside the inclined light blocking structure 402 to be disposed under the first layer 410, and the third layer 430 may be formed inside the inclined light blocking structure 402 to be disposed on or close to the lower surface of the inclined light blocking structure 402. The first to third layers 410, 420, 430 may define a light path 452. To this end, openings may be formed in the first to third layers 410, 420, and 430 at positions corresponding to the light path 452. The opening may be, for example, circular, and its diameter may be substantially equal to or smaller than the diameter of the lens 130. Additionally, the light blocking layer 440 may be formed on the flat surface between the lenses 130. The light blocking layer 440 may be formed of the light absorbing material.

The downward circularly-polarized light V2 and the unpolarized light PD1 that propagate in the substantially perpendicular direction toward the lower surface of the display panel 20 may reach the curved surface of the lens 130 without refraction. On the other hand, the downward circularly-polarized light V2 and the unpolarized light PD1 incident at an angle other than perpendicular to the lower surface of the display panel 20 may be refracted to reach the curved surface of the lens 130 or blocked by the light blocking layer 440.

The downward circularly-polarized light V2 and the unpolarized light PD1 that propagate in the substantially perpendicular direction to reach the curved surface of the lens 130 may be focused by the lens 130 and refracted toward the light receiving units 141 and 142. The refracted downward circularly-polarized light V2 and the unpolarized light PD1 may pass through the first sensor retarder 110 and the first sensor polarizer 120. The downward circularly-polarized light V3 may pass substantially without loss and become the downward linearly-polarized light V3, while the unpolarized light PD1 may become the sensor linearly-polarized light PD2 with the relatively reduced light amount.

The downward linearly-polarized light V3 and the sensor linearly-polarized light PD2 derived from the perpendicular light $I_{90}$ may pass through the light path 452 to reach the light receiving units 141 and 142. On the other hand, the downward linearly-polarized light V3 and the sensor linearly-polarized light PD2 derived from the inclined light $I_\theta$ may be blocked by the first to third layers 410, 420, and 430. The downward linearly-polarized light V3 and the sensor linearly-polarized light PD2 not blocked by the first to third layers 410, 420, 430 may pass through the light path 452, but be deviated from the receiving units 141, 142.

Figure 8:
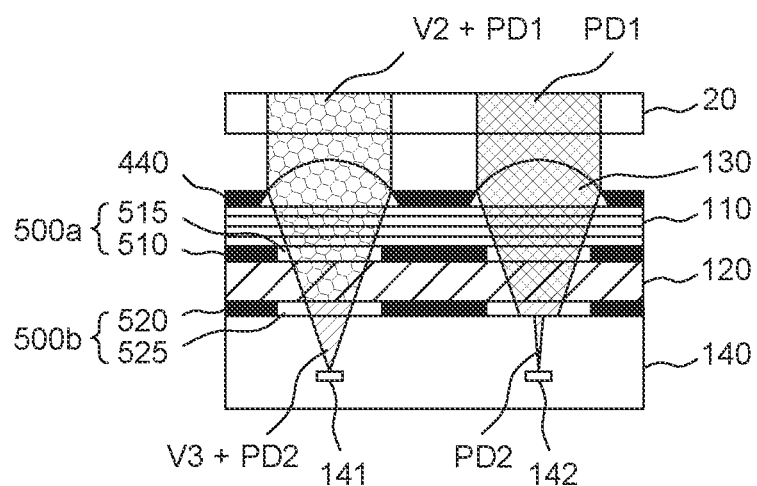
FIG. 8 exemplarily illustrates still another embodiments of the under-display fingerprint sensor that generates a fingerprint image having an improved contrast ratio.

FIG. 8 exemplarily illustrates still another embodiments of the under-display fingerprint sensor that generates a fingerprint image having an improved contrast ratio.

Referring to FIG. 8, the under-display fingerprint sensor may include the lens 130, the first sensor leader layer 110, a first inclined light blocking structure 500a, the first sensor polarizer 120, a second inclined light blocking structure 500b, and the image sensor 140. The lens 130 may be spaced apart from the lower surface of the display panel 20. The first and second inclined light blocking structures 500a and 500b may include light blocking regions 510 and 520 formed of the light absorbing material and light passing regions 515 and 525 formed of the optically transparent material. The light path region may be located under the lens 130. The first inclined light blocking structure 500a may be interinterposed between the first sensor retarder 110 and the first sensor polarizer 120, and the second inclined light blocking structure 500b may be interposed between the first sensor polarizer 120 and the image sensor 140.

Figure 9A:
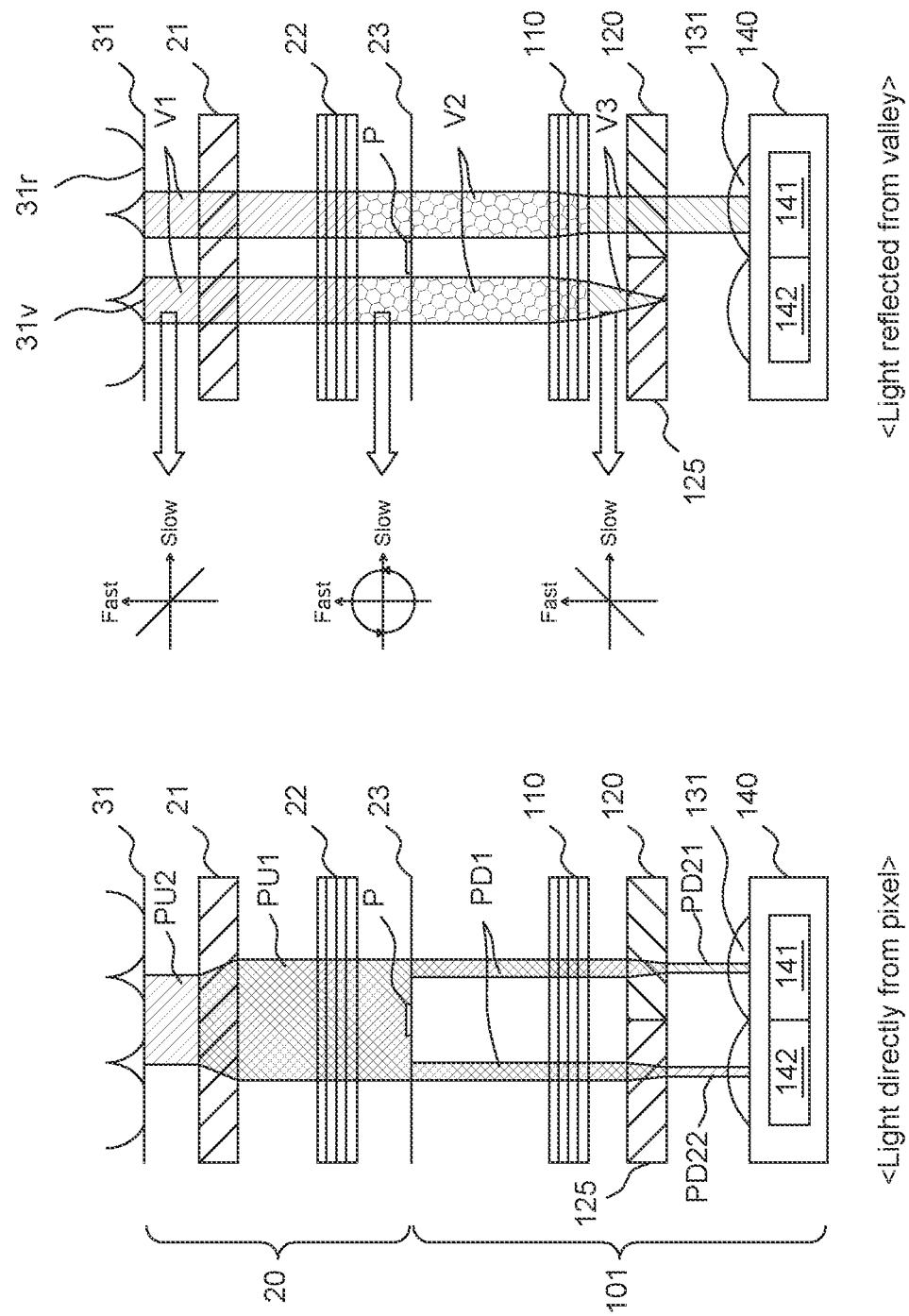
FIG. 9A exemplarily illustrates one embodiment of increasing a difference between the light emitted from the ridge of the fingerprint and the light emitted from the valley in the under-display fingerprint sensor, and FIG. 9B exemplarily illustrates another embodiment of increasing a difference between the light emitted from the ridge of the fingerprint and the light emitted from the valley in the under-display fingerprint sensor.
Figure 9B:
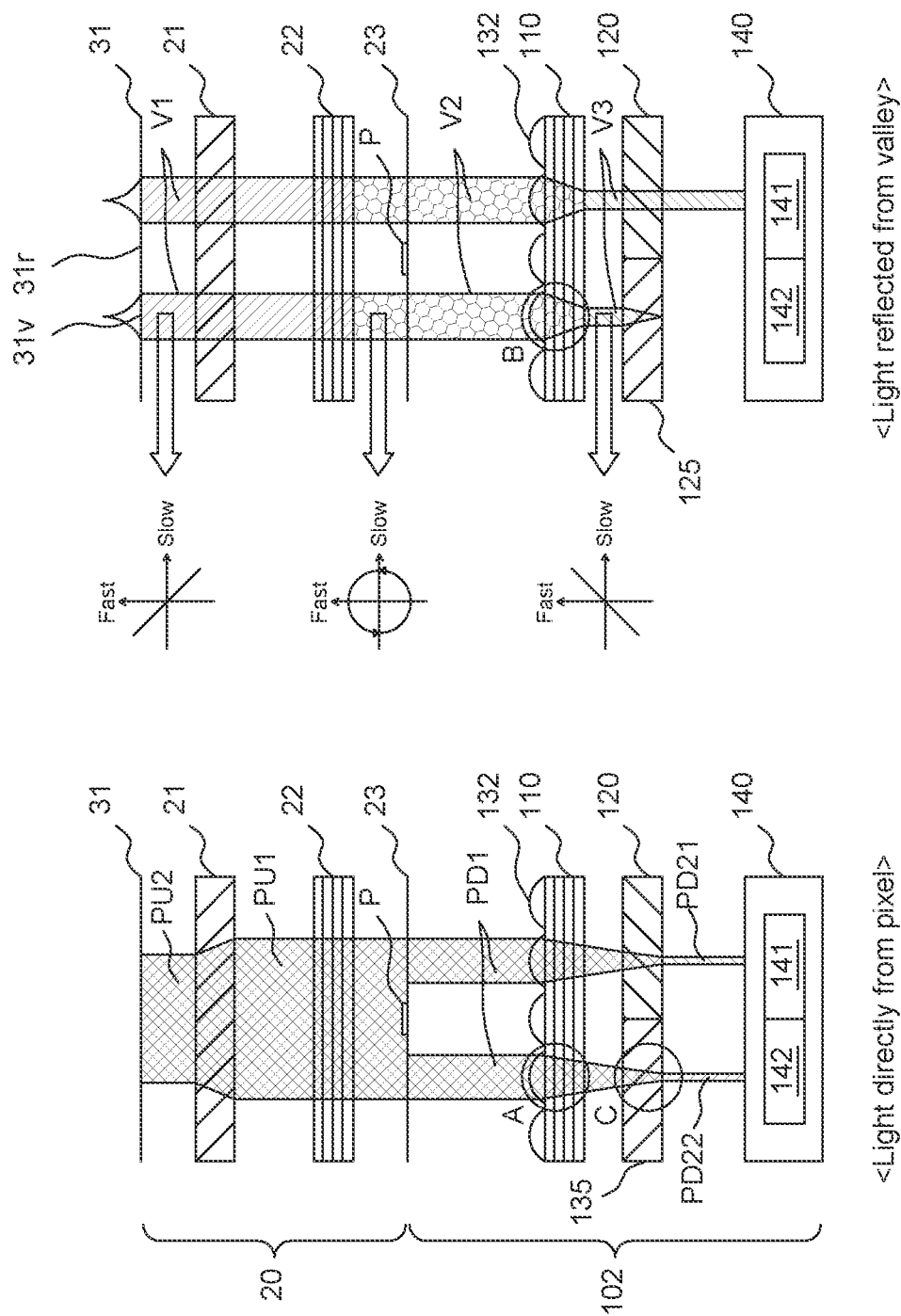

FIG. 9A exemplarily illustrates one baseline structure for increasing a difference between the light emitted from the ridge of the fingerprint and the light emitted from the valley in the under-display fingerprint sensor, and FIG. 9B exemplarily illustrates another baseline structure for increasing a difference between the light emitted from the ridge of the fingerprint and the light emitted from the valley in the under-display fingerprint sensor.

Referring to FIG. 9A, the under-display fingerprint sensor 101 may include a first sensor retarder 110, a first sensor polarizer 120, a second sensor polarizer 125, a lens 131 and an image sensor 140. The light selection layer may include the first sensor retarder 110, the first sensor polarizer 120, and the second sensor polarizer 125.

The first sensor retarder 110 may be disposed over the first sensor polarizer 120 and the second sensor polarizer 125, and the image sensor 140 may be disposed under the first sensor polarizer 120 and the second sensor polarizer 125. In the first sensor retarder 110, the slow axis may be formed substantially horizontally throughout.

The first sensor polarizer 120 and the second sensor polarizer 125 may be alternately disposed on the same plane. A polarization axis of the first sensor polarizer 120 and a polarization axis of the second sensor polarizer 125 may be inclined at different angles with respect to a slow axis of the first sensor retarder 110. The polarization axis of the first sensor polarizer 120 may be inclined at a first angle, for example, +45 degrees with respect to the slow axis of the first sensor retarder 110, and the polarization axis of the second sensor polarizer 125 may be inclined at a second angle, for example, −45 degrees with respect to the slow axis of the first sensor retarder 110. The first sensor polarizer 120 and the second sensor polarizer 125 may be spaced apart from the lens 131, and for example, air may be interposed therebetween.

In one embodiment, the light selection layer may be manufactured by laminating the first sensor retarder 110 on the upper surfaces of the first sensor polarizer 120 and the second sensor polarizer 125. The light selection layer may be attached to the lower surface of the display panel 20. In another embodiment, the image sensor 140 may be implemented by means of thin film transistor. For this reason, the under-display fingerprint sensor 101 may be manufactured by laminating the first sensor retarder 110, the first and second sensor polarizers 120 and 125, and the image sensor 140, all in the form of a film.

The lens 131 may be disposed on the image sensor 140. The lens 131 may focus the substantially perpendicularly propagating light $I_{90}$ which is at least a portion of a plurality of rays of the downward linearly-polarized light V3, the first sensor linearly-polarized light PD21, and the second sensor linearly-polarized light PD22 emitted from the light selection layer to the first light receiving unit 141 and the second light receiving unit 142 of the image sensor 140. In addition, the lens 131 may refract the inclined light $I_\theta$ which is a portion of the plurality of rays of the downward linearly-polarized light V3, the first sensor linearly-polarized light PD21, and the second sensor linearly-polarized light PD22 emitted from the light selection layer to be deviated from the first light receiving unit 141 and the second light receiving unit 142 of the image sensor 140. That is, the lens 131 may be disposed under one light path (or over one light receiving unit).

The image sensor 140 may include the first light receiving unit 141 and the second light receiving unit 142. The first light receiving unit 141 may be disposed under the first sensor polarizer 120, and the second light receiving unit 142 may be disposed under the second sensor polarizer 125. The first light receiving unit 141 of the image sensor 140 may detect the downward linearly-polarized light V3 and the first sensor linearly-polarized light PD21 emitted from the first sensor polarizer 120, and the second light receiving unit 142 may detect the second sensor linearly-polarized light PD22 emitted from the second sensor polarizer 125. The downward linearly-polarized light V3, the first sensor linearly-polarized light PD21, and the second sensor linearly-polarized light PD22 may be converted to pixel currents corresponding to the amounts of the received light.

Hereinafter, the operation of the under-display fingerprint sensor 101 having the above-described light selection layer will be described.

The light incident on the under-display fingerprint sensor 101 may be generated by the pixel P. In detail, most of the unpolarized light generated by the pixel P may propagate upwardly and the rest may propagate downwardly.

The unpolarized light PD1 propagating downwardly may pass through the light selection layer to become the first sensor linearly-polarized light PD21 and the second sensor linearly-polarized light PD22. The first sensor linearly-polarized light PD21 is light that has passed through the first light path of the light selection layer, and the second sensor linearly-polarized light PD22 is light that has passed through the second light path. The first sensor linearly-polarized light PD21 and the second sensor linearly-polarized light PD22 may have substantially the same light amount.

The upwardly propagating unpolarized light PU1 may pass through the display retarder 22 substantially losslessly and then may pass through the display polarizer 21 to become the upward linearly-polarized light PU2. The upward linearly-polarized light PU2 may be reflected from the fingerprint acquisition area 31 on the glass cover 30 and then may propagate downwardly. In the fingerprint acquisition area 31, the upward linearly-polarized light PU2 reaching the region 31r contacted by the ridge of the fingerprint may be mostly absorbed by the ridge and hardly reflected, but the upward linearly-polarized light PU2 reaching the region 31v below the valley of the fingerprint may be substantially reflected and may propagate downwardly. Hereinafter, the upward linearly-polarized light PU2 reflected from the region 31v below the valley of the fingerprint will be referred to as a downward linearly-polarized light V1.

Since the polarization axis of the downward linearly-polarized light V1 substantially coincides with the polarization axis of the display polarizer 21, the downward linearly-polarized light V1 may pass through the display polarizer 21 substantially losslessly. The display polarizer 21 may have the polarization axis inclined at a second angle, for example, −45 degrees with respect to the slow axis of the display retarder 22. Accordingly, the downward linearly-polarized light V1 that has passed through the display polarizer 21 may be incident on the the display retarder 22 at the second angle with respect to the slow axis of the display retarder 22. When the first polarization element of the downward linearly-polarized light V1 projected along the fast axis and the second polarization element of the downward linearly-polarized light V1 projected along the slow axis pass through the display retarder 22, a phase difference of $\lambda/4$ occurs between them. Due to this, the downward linearly-polarized light V1 that has passed through the display retarder 22 may become the downward circularly-polarized light V2 rotating in the counterclockwise direction. The downward circularly-polarized light V2 may be incident on the under-display fingerprint sensor 101 through the lower surface of the display panel 20.

The downward circularly-polarized light V2 and the unpolarized light PD1 may be incident on the upper surface of the first sensor retarder 110. The downward circularly-polarized light V2 originates from the downward linearly-polarized light V1 that has passed through the display polarizer 21 and the display retarder 22, and the unpolarized light PD1 is the light that propagates downwardly from the pixel P toward the under-display fingerprint sensor 101. The downward circularly-polarized light V2 having the phase difference of $\lambda/4$ between the fast axis and the slow axis becomes the downward linearly-polarized light V3 by the first sensor retarder 110. In detail, after the phase difference of $\lambda/4$ is added by the first sensor retarder 110, the downward circularly-polarized light V2 having the phase difference of $\lambda/4$ between the first polarization element and the second polarization element may become the downward linearly-polarized light V3 of which polarization axis is substantially orthogonal to the polarization axis of the downward linearly-polarized light V1. Meanwhile, the unpolarized light PD1 may pass through the first sensor retarder 110 substantially losslessly.

The downward linearly-polarized light V3 may pass through the first sensor polarizer 120 substantially losslessly, but may be attenuated by the second sensor polarizer 125. Since the downward linearly-polarized light V3 has the polarization axis substantially parallel to the polarization axis of the first sensor polarizer 120, it may pass through the first sensor polarizer 120 substantially without loss. On the other hand, since the downward linearly-polarized light V3 has the polarization axis substantially orthogonal to the polarization axis of the second sensor polarizer 125, it may be substantially blocked or attenuated (collectively 'attenuated') by the second sensor polarizer 125. The light amount of the unpolarized light PD1 may be greatly reduced by the first sensor polarizer 120 and the second sensor polarizer 125. In the case of the unpolarized light PD1, since it is a set of a plurality of rays of light having various characteristics, only light substantially parallel to the polarization axis of the first sensor polarizer 120 or the second sensor polarizer 125 among them can pass through the first sensor polarizer 120 or the second sensor polarizer 125. The unpolarized light PD1 that has passed through the first sensor polarizer 120 becomes the first sensor linearly-polarized light PD21, and the unpolarized light PD1 that has passed through the second sensor polarizing layer 125 becomes the second sensor linearly-polarized light PD22.

As described above, the first and second sensor linearly-polarized light P21 and P22 derived from the unpolarized light PD1 may be detected by the first light receiving unit 141 and the second light receiving unit 142, respectively. In particular, since the downward linearly-polarized light V2 may not be substantially incident on the second light receiving unit 142 by the light selection layer, the second light receiving unit 142 may measure only a brightness (or light amount) of the second sensor linearly-polarized light PD22 derived from the unpolarized light PD1. The brightness of the first and second sensor linearly-polarized light P21 and P22 may be substantially the same, conversely, may be different. However, since the first and second sensor linearly-polarized light P21 and P22 are derived from the unpolarized light PD1 generated by one or a plurality of pixels, a linearly-proportional relationship or a nonlinearly-proportional relationship may be established for the brightness between them. The nonlinearly-proportional relationship may be due to various factors, such as a structural characteristic of the display panel 20, a difference in pixel areas corresponding to each light receiving unit, and a wavelength band of the unpolarization light PD1. According to the proportional relationship between the first and second sensor linearly-polarized light P21 and P22, the contribution of the first sensor linearly-polarized light PD21 to the brightness measured by the first light receiving unit 141 may be calculated from the brightness of the second sensor linearly-polarized light PD22 measured by the second light receiving unit 142.

The under-display fingerprint sensor 101 is a device for generating a fingerprint image by measuring the brightness of light reflected from the region 31v below the valley of the fingerprint. Pixel P of the display panel 20 may emit not only light to be reflected from the fingerprint acquisition area 31 but also light to be directly incident on the under-display fingerprint sensor 101. This is because the under-display fingerprint sensor 101 is disposed under the display panel 20. For this reason, the image sensor 140 in the under-display fingerprint sensor 101 may receive both the light reflected due to the fingerprint and the directly incident light. In particular, since light reflected from the region 31r in contact with the ridges of the fingerprint does not substantially exist, the light receiving unit corresponding to the ridges of the fingerprint should not generate a pixel current according to light detection. However, due to the light directly incident without being reflected by the fingerprint acquisition area 31, the light receiving unit corresponding to the ridge of the fingerprint may generate the unignorable amount of pixel current. Due to the pixel current generated by the light receiving unit corresponding to the ridge of the fingerprint, the contrast ratio of the generated fingerprint image may be lowered. In order to increase the contrast ratio of the generated fingerprint image, it is necessary to measure the brightness of the light generated inside the display panel 20.

Referring to FIG. 9B, an under-display fingerprint sensor 102 may be disposed under the display panel 20. The under-display fingerprint sensor 102 may include a lens 132, the first sensor retarder 110, the first sensor polarizer 120, the second sensor polarizer 125, and the image sensor 140. Here, the light selection layer may include the first sensor retarder 110, the first sensor polarizer 120, and the second sensor polarizer 125.

The lens 132 may be spaced apart from the lower surface of the display panel 20 and, for example, air may be interposed therebetween. The lens 132 may focus the substantially perpendicularly propagating light $I_{90}$ which is at least the portion of the plurality of rays of the unpolarized light PD1 and the downward linearly-polarized light V2 to the first light receiving unit 141 and the second light receiving unit 142 of the image sensor 140. In addition, the lens 132 may refract the inclined light $I_\theta$ in the downward circularly-polarized light V2 and the unpolarized light PD1 to be deviated from the first light receiving unit 141 and the second light receiving unit 142. That is, one lens 132 may be disposed under one light path (or over one light receiving unit). Accordingly, there may be a plurality of lenses 132.

The first sensor retarder 110 may be disposed under the lens 132. In the first sensor retarder 110, the slow axis may be formed substantially horizontally throughout. The first sensor polarizer 120 and the second sensor polarizer 125 may be disposed under the first sensor retarder 110. The first sensor polarizer 120 and the second sensor polarizer 125 may be alternately disposed on the same plane.

Hereinafter, the operation of the under-display fingerprint sensor 102 having the above-described light selection layer will be described.

The downward circularly-polarized light V2 and the unpolarized light PD1 are emitted from the lower surface of the display panel 20, and incident on the under display fingerprint sensor 102. The space between the display panel 20 and the lens 132 may be filled with, for example, air. Accordingly, the lower surface of the display panel 20 is an interface between two media having different refractive indices. Since the refractive index of air is smaller than the refractive index of the display panel 20, light directed toward the lower surface in the display panel 20 may be refracted at a refraction angle greater than an incidence angle. Light in the substantially perpendicular direction to the lower surface of the display panel 20 may not be refracted. However, light incident at an angle other than perpendicular may be refracted. Accordingly, most of rays of light incident on the lens from the lower surface of the display panel 20 may be light propagating in the substantially perpendicular direction. A structure for blocking the inclined light will be described in detail with reference to FIG. 10A through FIG. 12D. Meanwhile, a portion of rays of the inclined light may also be incident on the lens 130, but may be refracted to be deviated from the first light receiving unit 141 or the second light receiving unit 142 by the lens 130.

The downward circularly-polarized light V2 and the unpolarized light PD1 propagating in the substantially perpendicular may be incident on the lens 132. The downward circularly-polarized light V2 is the downward linearly-polarized light V1 that has passed through the display polarizer 21 and the display retarder 22, and the unpolarized light PD1 is light that propagates downwardly from the pixel P toward the under-display fingerprint sensor 102. The lens 130 may refracts the downward circularly-polarized light V2 and the unpolarized light PD1 to be focused to the first light receiving unit 141 and the second light receiving unit 142.

The refracted downward circularly-polarized light V2 and the unpolarized light PD1 may be incident on the first sensor retarder 110. A indicates that the unpolarized light PD1 is focused by the lens 132 and is incident on the first sensor retarder 110 without substantial loss in the light amount, and B indicates that the downward circularly-polarized light V2 is focused without substantial loss in the light amount by the lens 132 to be incident on the first sensor retarder 110. The refracted downward circularly-polarized light V2 having a phase difference of $\lambda/4$ between the fast axis and the slow axis becomes the downward linearly-polarized light V3 by the first sensor retarder 110. In detail, after the phase difference of $\lambda/4$ is added by the first sensor retarder 110, the downward circularly-polarized light V2 having the phase difference of $\lambda/4$ between the first polarization element and the second polarization element may become the downward linearly-polarized light V3 of which polarization axis is substantially orthogonal to the polarization axis of the downward linearly-polarized light V1. Meanwhile, the unpolarized light PD1 may pass through the first sensor retarder 110 substantially without loss.

The downward linearly-polarized light V3 may pass through the first sensor polarizer 120 substantially losslessly, but may be attenuated by the second sensor polarizer 125. Since the downward linearly-polarized light V3 has the polarization axis substantially parallel to the polarization axis of the first sensor polarizer 120, it may pass through the first sensor polarizer 120 without substantially loss. On the other hand, since the downward linearly-polarized light V3 has the polarization axis substantially perpendicular to the polarization axis of the second sensor polarizer 125, it may be attenuated by the second sensor polarizer 125. C indicates that the light amount of the unpolarized light PD1 is greatly reduced by the first sensor polarizer 120 and the second sensor polarizer 125. In the case of the unpolarized light PD1, since it is a set of a plurality of rays of light having various characteristics, only light substantially parallel to the polarization axis of the first sensor polarizer 120 or the second sensor polarizer 125 among them can pass through the first sensor polarizer 120 or the second sensor polarizer 125. The unpolarized light PD1 that has passed through the first sensor polarizer 120 becomes the first sensor linearly-polarized light PD21, and the unpolarized light PD1 that has passed through the second sensor polarizing layer 125 becomes the second sensor linearly-polarized light PD22.

As described above, the first and second sensor linearly-polarized light P21 and P22 derived from the unpolarized light PD1 may be detected by the first light receiving unit 141 and the second light receiving unit 142, respectively. In particular, since the downward linearly-polarized light V2 may not be substantially incident on the second light receiving unit 142 by the light selection layer, the second light receiving unit 142 may measure only the brightness of the second sensor linearly-polarized light PD22 derived from the unpolarized light PD1. The brightness of the first and second sensor linearly-polarized light P21 and P22 may be substantially the same, conversely, may be different. However, since the first and second sensor linearly-polarized light P21 and P22 are derived from the unpolarized light PD1 generated by one or a plurality of pixels, a linearly-proportional relationship or a nonlinearly-proportional relationship may be established for the brightness between them. The nonlinearly-proportional relationship may be due to various factors, such as a structural characteristic of the display panel 20, a difference in pixel areas corresponding to each light receiving unit, and a wavelength band of the unpolarization light PD1. According to the proportional relationship between the first and second sensor linearly-polarized light P21 and P22, the contribution of the first sensor linearly-polarized light PD21 to the brightness measured by the first light receiving unit 141 may be calculated from the brightness of the second sensor linearly-polarized light PD22 measured by the second light receiving unit 142.

The under-display fingerprint sensor 102 is a device for generating a fingerprint image by detecting light reflected from the region 31v below the valley of the fingerprint. Pixel P of the display panel 20 may emit not only light to be reflected from the fingerprint acquisition area 31 but also light to be directly incident on the under-display fingerprint sensor 102. This is because the under-display fingerprint sensor 102 is disposed under the display panel. For this reason, the image sensor 140 in the under-display fingerprint sensor 102 may receive both the light reflected due to the valley of the fingerprint and the directly incident light. In particular, since light reflected from the region 31r in contact with the ridges of the fingerprint does not substantially exist, the light receiving unit corresponding to the ridges of the fingerprint should not generate a pixel current according to an amount of detected light. However, due to the light directly incident without being reflected by the fingerprint acquisition area 31, the light receiving unit corresponding to the ridge of the fingerprint may generate an unignorable amount of pixel current. Due to the pixel current generated by the light receiving unit corresponding to the ridge of the fingerprint, the contrast ratio of the generated fingerprint image may be lowered. In order to increase the contrast ratio of the generated fingerprint image, it is necessary to measure the brightness of the light generated inside the display panel 20.

Hereinafter, various embodiments for improving the contrast ratio of a fingerprint image will be described. It should be understood that the baseline structure for improving the contrast ratio of the fingerprint image described with reference to FIGS. 9A and 9B will be not limited to their variant structures illustrated in FIGS. 10A to 14, and may be combined with another structure described in other accompanying drawings.

Figure 10A:
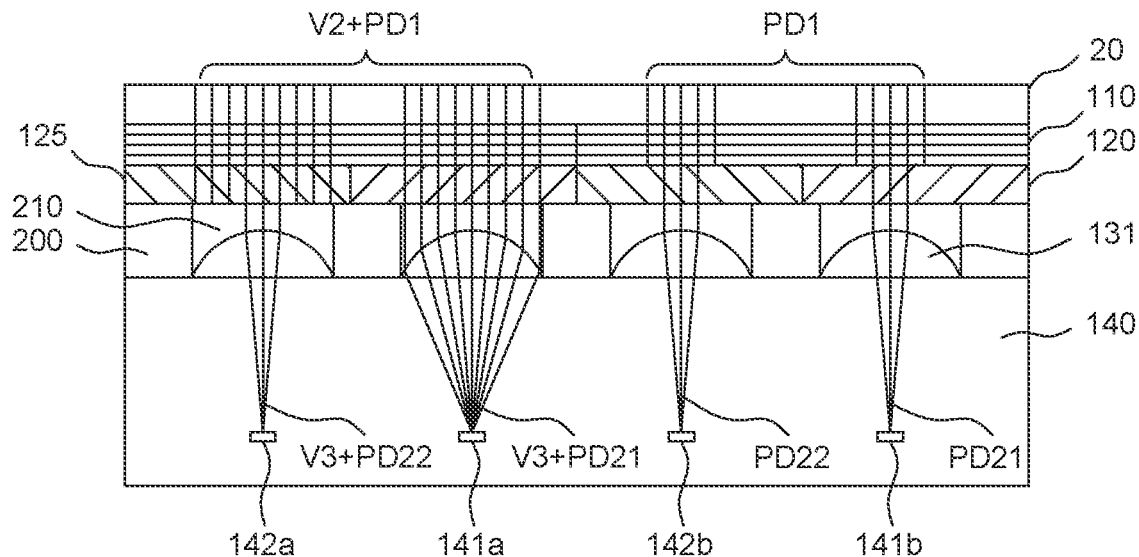
FIG. 10A and FIG. 10B exemplarily illustrate embodiments of the under-display fingerprint sensor that generates a fingerprint image having an improved contrast ratio.
Figure 10B:
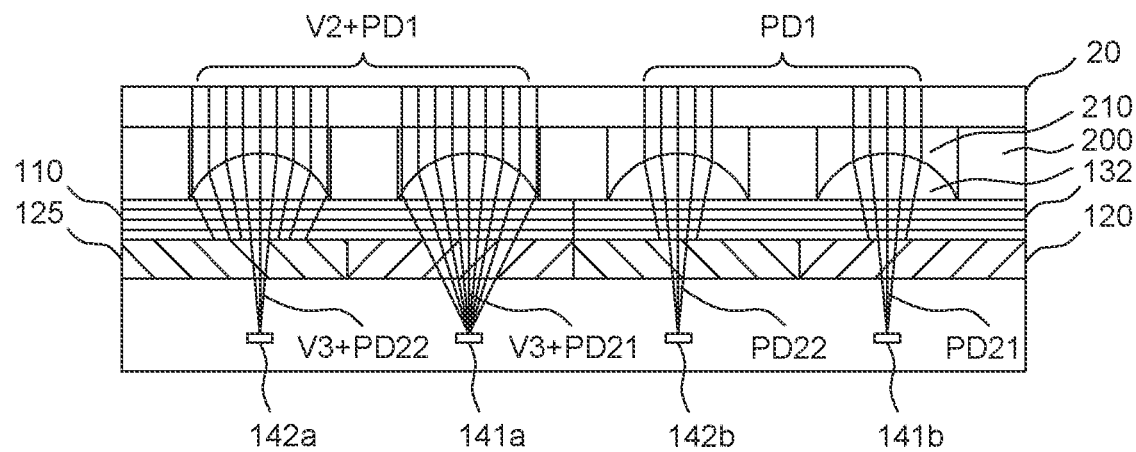

FIG. 10A and FIG. 10B exemplarily illustrate embodiments of the under-display fingerprint sensor that generates a fingerprint image having an improved contrast ratio.

Referring to FIG. 10A, the under-display fingerprint sensor may include the inclined light blocking structure 200 interposed between the light selection layer and the image sensor 140. The light selection layer may include the first sensor retarder 110, the first sensor polarizer 120 and the second sensor polarizer 125 alternately disposed under the first sensor retarder 100. The inclined light blocking structure 200 may be formed of, for example, the light absorbing material that does not pass light therein, and has the plurality of through holes 210 extending substantially vertically from the upper surface to the lower surface thereof. The plurality of through-holes 210 may be formed at positions corresponding to the lenses 131, and the cross-section of the through-holes 210 may be, for example, the circular shape, but is not limited thereto. When the cross-section is circular, the diameter of the through hole 210 may be substantially the same as or greater than the diameter of the lens 131. That is, when the inclined light blocking structure 200 is disposed on the upper surface of the image sensor 140, the lens 131 may be accommodated in the through hole 210.

The first sensor polarizer 120 and the second sensor polarizer 125 may be arranged in a zigzag manner. In the zigzag arrangement, for example, four second sensor polarizers 125 having quadrangular shape may be arranged on four sides of one first sensor polarizer 120 having the same shape, or four first sensor polarizers 120 having quadrangular shape may be arranged on four sides of one second sensor polarizer 125. In the zigzag arrangement, a pair of the first light receiving unit 141a and the second light receiving unit 142a may receive light reflected from the same point on the fingerprint acquisition area 31.

The perpendicular light $I_{90}$, namely, V2 and PD1 that are substantially perpendicularly incident toward the through hole 210 may reach the curved surface of the lens 131 without refraction. The inclined light $I_\theta$ incident at an angle other than perpendicular toward the through hole 210 may be refracted on the lower surface of the light selection layer. A portion of rays of the refracted light may be blocked by the inner lateral surface of the through hole 210. The remaining portion of rays of the refracted light that is not blocked by the inner lateral surface of the through hole 210 may reach the curved surface of the lens 131. The inclined light $I_\theta$ incident on the curved surface of the lens 131 may be refracted into the image sensor 140, but can not reach the focal point f of the lens 131. The light receiving units 141a and 142a may be disposed at the focal point f of the lens 131. The perpendicular light $I_{90}$ and the inclined light $I_\theta$ incident to the region other than the through hole 210 may be blocked by the upper surface of the inclined light blocking structure 200 and do not reach the lens 131.

When light V2 and light PD1 are incident from the display panel 20 over the first light receiving unit 141a and the second light receiving unit 142a, the first light receiving unit 141a may detect the downward linearly-polarized light V3 and the first sensor linearly-polarized light PD21 propagating through the first light path formed by the first sensor retarder 110 and the first sensor polarizer 120, and the second light receiving unit 142a may detect the downward linearly-polarized light V3 and the second sensor linearly-polarized light PD22 propagating through the second light path formed by the first sensor retarder 110 and the second sensor polarizer 125. The light amounts of V3 and PD21 received by the first light receiving unit 141a may be different from the light amounts of V3 and PD22 received by the second light receiving unit 142a.

On the other hand, when light PD1 is incident from the display panel 20 over the first light receiving unit 141b and the second light receiving unit 142*b*, the first light receiving unit 141*b* may detect the second sensor linearly-polarized light PD21 through the first light path formed by the first sensor retarder 110 and the first sensor polarizer 120, and the second light receiving unit 142*b* may detect the second sensor linearly-polarized light PD22 through the second light path formed by the first sensor retarder 110 and the second sensor polarizer 125. The light amount of the PD21 received by the first light receiving unit 141*b* and the light amount of the PD22 received by the second light receiving unit 142*b* may be substantially the same.

Referring to FIG. 10B, the under-display fingerprint sensor may include the inclined light blocking structure 200 interposed between the display panel 20 and the light selection layer. The light selection layer may include the first sensor retarder 110, the first sensor polarizer 120 and the second sensor polarizer 125 alternately disposed under the first sensor retarder 110. The inclined light blocking structure 200 may be formed of, for example, the light absorbing material that does not pass light therein, and has the plurality of through holes 210 extending substantially vertically from the upper surface to the lower surface thereof. The plurality of through-holes 210 may be formed at positions corresponding to the lenses 132, and the cross-section of the through-holes 210 may be, for example, the circular shape, but is not limited thereto. When the cross section is circular, the diameter of the through hole 210 may be substantially the same as or greater than the diameter of the lens. That is, when the inclined light blocking structure 200 is disposed on the upper surface of the light selection layer, one lens 132 may be accommodated in one through hole 210.

The perpendicular light $I_{90}$ incident substantially perpendicularly toward the through hole 210 may reach the curved surface of the lens 132 without refraction. The inclined light $I_\theta$ incident toward the through hole 210 at an angle other than perpendicular may be refracted on the lower surface of the light selection layer. A portion of rays of the refracted light may be blocked by the inner lateral surface of the through hole 210. The remaining portion of rays of the refracted light that is not blocked by the inner lateral surface of the through hole 210 may reach the curved surface of the lens 132. The inclined light $I_\theta$ incident on the curved surface of the lens 132 may be refracted into the image sensor 140, but can not reach the focal point f of the lens 132. The light receiving units 141 and 142 may be disposed at the focal point f of the lens 132. The perpendicular light $I_{90}$ and the inclined light $I_\theta$ incident to the region other than the through hole 210 may be blocked by the upper surface of the inclined light blocking structure 200 and do not reach the lens 132.

The perpendicular light $I_{90}$ refracted toward the light receiving units 141*a* and 142*a* by the lens 132 may be incident on the first sensor retarder 110. The refracted perpendicular light $I_{90}$ that has passed through the first sensor retarder 110 is incident on the first sensor polarizer 120 and the second sensor polarizer 125. The first sensor polarizer 120 and the second sensor polarizer 125 may be arranged in the zigzag manner. In the zigzag arrangement, for example, four second sensor polarizers 125 having quadrangular shape may be arranged on four sides of one first sensor polarizer 120 having the same shape, or four first sensor polarizers 120 having quadrangular shape may be arranged on four sides of one second sensor polarizer 125. In the zigzag arrangement, a pair of the first light receiving unit 141*a* and the second light receiving unit 142*a* may receive light reflected from the same point on the fingerprint acquisition area 31. Accordingly, when light V2 and light PD1 are incident from the display panel 20 over the first light receiving unit 141*a* and the second light receiving unit 142*a*, the first light receiving unit 141*a* and the second light receiving unit 142*a* may respectively receive light V3 and PD21 that have different light amounts of light. On the other hand, when light PD1 is incident from the display panel 20 over the first light receiving unit 141*b* and the second light receiving unit 142*b*, the first light receiving unit 141*b* and the second light receiving unit 142*b* may receive light PD21 and light PD22 that have substantially the same light amount.

Figure 11:
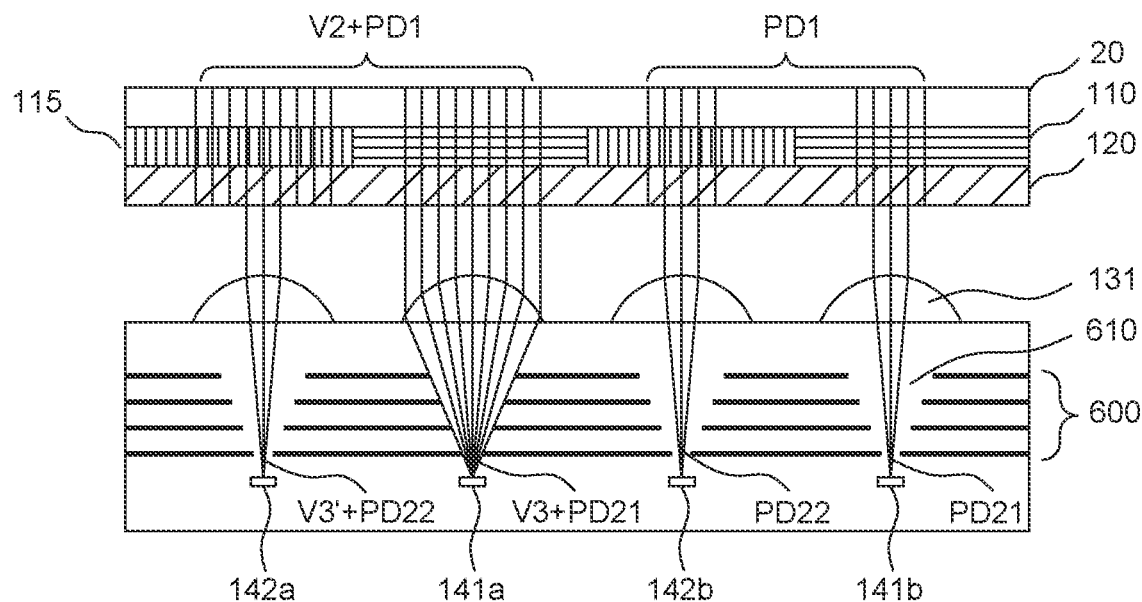
FIG. 11 exemplarily illustrate another embodiment of the under-display fingerprint sensor that generates a fingerprint image having an improved contrast ratio.

FIG. 11 exemplarily illustrate another embodiment of the under-display fingerprint sensor that generates a fingerprint image having an improved contrast ratio.

Referring to FIG. 11, the under-display fingerprint sensor may include an inclined light blocking structure 600 formed inside the image sensor 140. The inclined light blocking structure 600 may be interposed between the lens array and the light receiving units 141*a* and 142*a*. The inclined light blocking structure 600 may include a plurality of layers formed of, for example, the light absorbing material that does not pass light therein. The inclined light blocking structure 600 may define a light path 610 in which the perpendicular light $I_{90}$ is focused by the lens and reaches the light receiving units 141*a* and 142*a*. To this end, in each layer, an opening may be formed at the position corresponding to the light path 610. The opening may be, for example, circular, and the diameter of the opening formed in each layer along the light path 610 may be different. For example, the diameter of the opening formed in the layer closest to the lens 131 may be the largest, and the diameter of the opening may be decreased as it approaches the light receiving units 141*a* and 142*a*.

The light path 610 defined by the plurality of openings may block the light refracted by the lens 131. Based on the cross-section, the perpendicular light $I_{90}$ propagating in the substantially perpendicular direction may pass through the inverted triangular light path 610 only when it is refracted by the lens 131, in other words, focused toward the focal point f. The inclined light $I_\theta$ incident at an angle other than perpendicular may be blocked by each layer defining the light path 610 and can not reach the light receiving units 141*a* and 142*a*.

Hereinafter, the operation of the under-display fingerprint sensor 101 having the above-described light selection layer will be described.

The downward circularly-polarized light V2 and the unpolarized light PD1 may be emitted from the lower surface of the display panel 20 to be incident on the upper surfaces of the first sensor retarder 110 and the second sensor retarder 115. The downward circularly-polarized light V2 having the phase difference of λ/4 between the fast axis and the slow axis becomes the downward linearly-polarized light V3 by the first sensor retarder 110 and the downward linearly-polarized light V3' by the second sensor retarder 115. Since the slow axis of the first sensor retarder 110 and the slow axis of the second sensor retarder 115 are orthogonal, the polarization axis of the downward linearly-polarized light V3 and the polarization axis of the downward linearly-polarized light V3' may also be orthogonal. In detail, after the phase difference of λ/4 is added by the first sensor retarder 110, the downward circularly-polarized light V2 having the phase difference of λ/4 between the first polarization element and the second polarization element may become the downward linearly-polarized light V3 of which polarization axis is substantially orthogonal to the polarization axis of the downward linearly-polarized light V1. On the other hand, since the phase difference is eliminated by the second sensor retarder 115, the downward circularly-polarized light V2 may become the downward linearly-polarized light V3' having the polarization axis substantially parallel to the polarization axis of the downward linearly-polarized light V1. Meanwhile, the unpolarized light PD1 may pass through the first and second sensor retarders 110 and 115 without significant loss.

The downward linearly-polarized light V3 from the first sensor retarder 110 may pass through the first sensor polarizer 120, while the downward linearly-polarized light V3' from the second sensor retarder 115 may not pass through the first sensor polarizer 120. The first sensor polarizer 120 has the polarization axis inclined at the first angle with respect to the slow axis of the first sensor retarder 110, for example, +45 degrees at the second angle with respect to the slow axis of the second sensor retarder 115, for example −45 degrees. Accordingly, since the polarization axis of the downward linearly-polarized light V3 is substantially parallel to the polarization axis of the first sensor polarizer 120, the downward linearly-polarized light V3 may pass through the first sensor polarizer 120 substantially without loss. On the other hand, since the polarization axis of the downward linearly-polarized light V3' is substantially perpendicular to the polarization axis of the first sensor polarizer 120, the downward linearly-polarized light V3' may be attenuated by the first sensor polarizer 120. Meanwhile, the unpolarized light PD1 that has passed through the first and second sensor retarders 110 and 115 and the first sensor polarizer 120 becomes the first sensor linearly-polarized light PD21 and the second sensor linearly-polarized light PD22, respectively. The polarization axes of the first sensor linearly-polarized light PD21 and the second sensor linearly-polarized light PD22 may be substantially the same.

The downward linearly-polarized light V3, the first sensor linearly-polarized light PD21 and the second sensor linearly-polarized light PD22 may be incident on the image sensor 140 after being focused by the lens 131. That is, through the first light path formed by the first sensor retarder 110 and the first sensor polarizer 120, the first light receiving unit 141a may detect the downward linearly-polarized light V3 and the first sensor linearly-polarized light PD21. Meanwhile, the second light receiving unit 142 may detect the second sensor linearly-polarized light PD22 through the second light path formed by the second sensor retarder 115 and the first sensor polarizer 120.

When light V2 and light PD1 are incident from the display panel 20 over the first light receiving unit 141a and the second light receiving unit 142a, the first light receiving unit 141a may detect the downward linearly-polarized light V3 and the first sensor linearly-polarized light PD21 propagating through the first light path formed by the first sensor retarder 110 and the first sensor polarizer 120, and the second light receiving unit 142a may detect the downward linearly-polarized light V3' and the second sensor linearly-polarized light PD22 propagating through the second light path formed by the second sensor retarder 115 and the first sensor polarizer 120. The light amounts of V3 and PD21 received by the first light receiving unit 141a may be different from the light amounts of V3' and PD22 received by the second light receiving unit 142a.

On the other hand, when light PD1 is incident from the display panel 20 over the first light receiving unit 141b and the second light receiving unit 142b, the first light receiving unit 141b may detect the second sensor linearly-polarized light PD21 through the first light path formed by the first sensor retarder 110 and the first sensor polarizer 120, and the second light receiving unit 142b may detect the second sensor linearly-polarized light PD22 through the second light path formed by the second sensor retarder 115 and the first sensor polarizer 120. The light amount of the PD21 received by the first light receiving unit 141b and the light amount of the PD22 received by the second light receiving unit 142b may be substantially the same.

FIG. 12A, FIG. 12B, FIG. 12C and FIG. 12D exemplarily illustrate embodiments of the under-display fingerprint sensor that generates a fingerprint image having an improved contrast ratio.

Figure 12A:
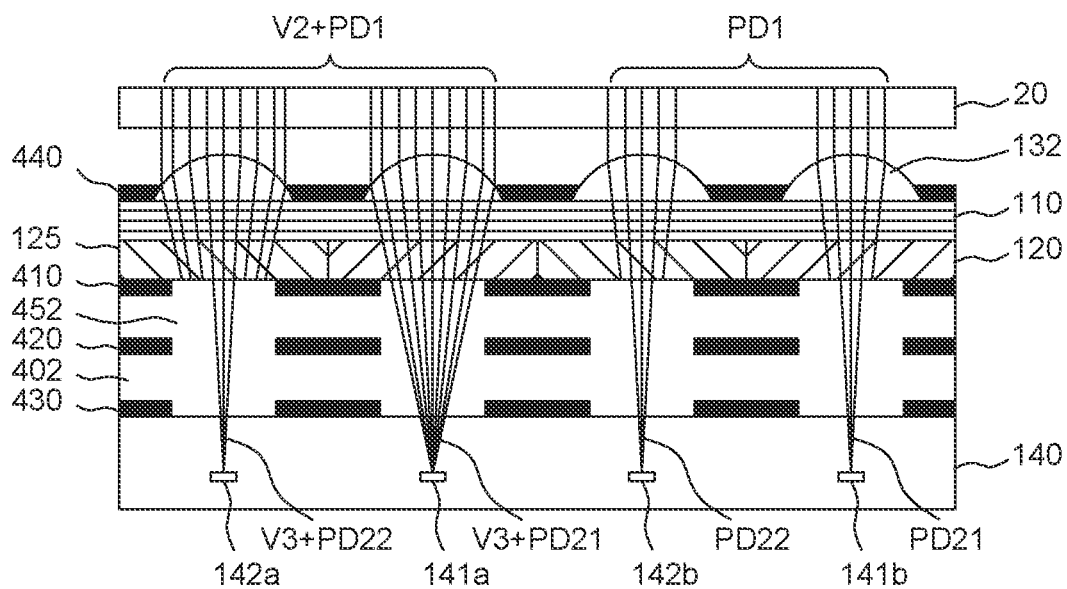
FIG. 12A, FIG. 12B, FIG. 12C and FIG. 12D exemplarily illustrate embodiments of the under-display fingerprint sensor that generates a fingerprint image having an improved contrast ratio.

Referring to FIG. 12A, the under-display fingerprint sensor may include the lens 132, the light selection layer, the inclined light blocking structure 402, and the image sensor 140. The lens 132 may be spaced apart from the lower surface of the display panel 20. The light selection layer may be disposed under the lens 132. In detail, the first sensor retarder 110 may be disposed under the inclined light blocking structure 402, and the first sensor polarizer 120 and the second sensor polarizer 125 may be disposed under the first sensor retarder 110.

The perpendicular light $I_{90}$, that is, the downward circularly-polarized light V2 and the unpolarized light PD1, incident substantially perpendicular toward the lower surface of the display panel 20, may reach the curved surface of the lens 132 without refraction. On the other hand, the inclined light $I_\theta$ incident toward the lower surface of the display panel 20 at an angle other than perpendicular may be refracted to reach the curved surface of the lens 132 or may be blocked by the light blocking layer 440.

The perpendicular light $I_{90}$ propagating in the substantially perpendicular direction toward the curved surface of the lens 132 may be focused by the lens 132 and refracted toward the light receiving units 141a and 142a. The refracted perpendicular light $I_{90}$ may pass through any one of the first light path and the second light path formed by the light selection layer. The downward circularly-polarized light V2 may pass through the first light path substantially without loss to become the downward linearly-polarized light V3, but may be blocked by the second light path. On the other hand, the unpolarized light PD1 may pass through the first light path to become the first sensor linearly-polarized light PD21, and may pass through the second light path to become the second sensor linearly-polarized light PD22. Light amounts of the first sensor linearly-polarized light PD21 and the second sensor linearly-polarized light PD22 may be reduced compared to the unpolarized light PD1.

The downward linearly-polarized light V3, the first sensor linearly-polarized light PD21, and the second sensor linearly-polarized light PD22 derived from the perpendicular light $I_{90}$ may pass through the light path 452 to reach the light receiving units 141a and 142a. On the other hand, the downward linearly-polarized light V3, the first sensor linearly-polarized light PD21, and the second sensor linearly-polarized light PD22 derived from the inclined light $I_\theta$ may be blocked by the first to third layers 410, 420, and 430. The inclined light $I_\theta$, which is not blocked by the first to third layers 410, 420, and 430, may pass through the light path 452, but may be deviated from the light receiving units 141a and 142a.

Therefore, when light V2 and light PD1 have passed through the first light path formed by the first sensor retarder 110 and the first sensor polarizer 120 to become the downward linearly-polarized light V3 and the first sensor linearly-polarized light PD21, the first light receiving unit 141a may detect the downward linearly-polarized light V3 and the first sensor linearly-polarized light PD21. When light V2 and light PD1 have pass through the second light path formed by the first sensor retarder 110—the second sensor polarizer 125 to become the downward linearly polarized V3 and the second sensor linearly-polarized light PD22, the second light receiving unit 142a may detect the downward linearly polarized V3 and the second sensor linearly-polarized light PD22. The light amounts of V3 and PD21 received by the first light receiving unit 141a may be different from the light amounts of V3 and PD22 received by the second light receiving unit 142a.

When light V2 and light PD1 are incident from the display panel 20 over the first light receiving unit 141b and the second light receiving unit 142b, the first light receiving unit 141b may detect the first sensor linearly-polarized light PD21 propagating through the first light path formed by the first sensor retarder 110 and the first sensor polarizer 120, and the second light receiving unit 142b may detect the second sensor linearly-polarized light PD22 propagating through the second light path formed by the first sensor retarder 110 and the second sensor polarizer 125. The light amount of the PD21 received by the first light receiving unit 141b and the light amount of the PD22 received by the second light receiving unit 142b may be substantially the same.

Figure 12B:
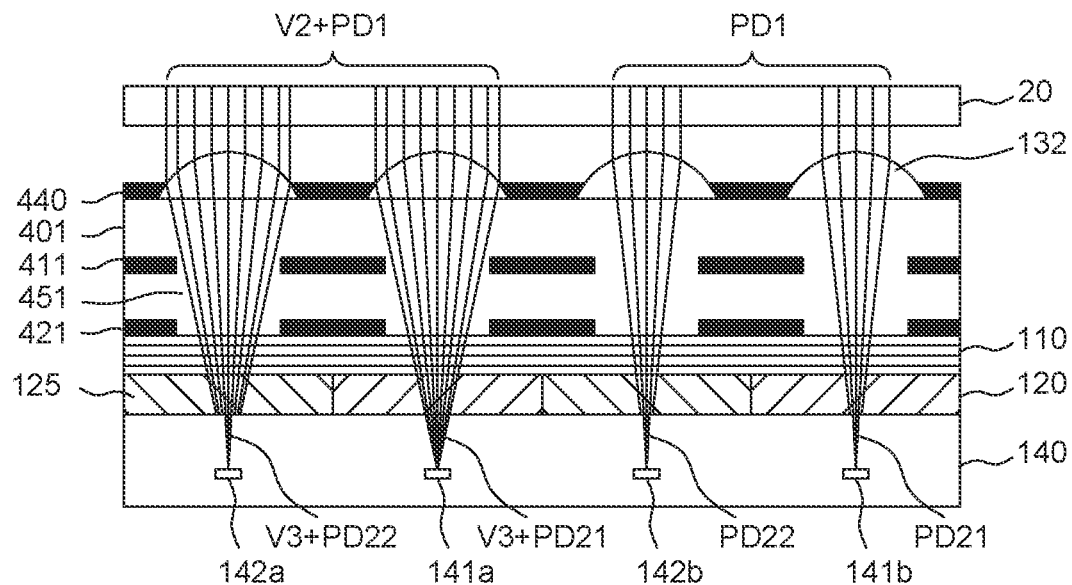

Referring to FIG. 12B, the under-display fingerprint sensor may include the lens 132, the inclined light blocking structure 401, the light selection layer, and the image sensor 140. The lens 132 may be spaced apart from the lower surface of the display panel 20. The inclined light blocking structure 401 may be formed of the optically transparent material and may include a plurality of layers 411 and 421 formed of the light absorbing material. The first layer 411 may be formed inside the inclined light blocking structure 401, and the second layer 421 may be formed inside the inclined light blocking structure 401 to be disposed on or close to the lower surface of the inclined light blocking structure 401. The first to second layers 411 and 421 may define the light path 451 through which light propagating toward the light receiving units 141a and 142a by the lens 132 can pass. To this end, in the first to second layers 411 and 421, openings may be formed at positions corresponding to the light paths 451. The opening may be, for example, circular, and its diameter may be substantially equal to or smaller than the diameter of the lens 132. Additionally, the light blocking layer 440 may be formed on the flat surface between the lenses 132. The light blocking layer 440 may be formed of the light absorbing material. The first sensor retarder 110 may be disposed under the inclined light blocking structure 401, and the first sensor polarizer 120 and the second sensor polarizer 125 may be disposed under the first sensor retarder 110.

The perpendicular light $I_{90}$, that is, the downward circularly-polarized light V2 and the unpolarized light PD1, incident substantially perpendicular toward the lower surface of the display panel 20, may reach the curved surface of the lens 132 without refraction. On the other hand, the inclined light $I_\theta$ incident toward the lower surface of the display panel 20 at an angle other than perpendicular may be refracted to reach the curved surface of the lens 132 or may be blocked by the light blocking layer 440.

The perpendicular light $I_{90}$ propagating in the substantially perpendicular direction toward the curved surface of the lens 132 may be focused by the lens 132 and refracted toward the light receiving units 141a and 142a. The refracted perpendicular light $I_{90}$ may pass through the light path 451 to reach the light path layer. On the other hand, the inclined light $I_\theta$ that propagates at an angle other than perpendicular and are incident on the curved surface of the lens 132 may be refracted by the lens 132, and can be blocked by the first to second layers 411 forming the light path 451. The inclined light $I_\theta$ not blocked by the first to second layers 411 and 421 may pass through the light path 451, but be deviated from the receiving units 141a and 142a.

The refracted perpendicular light $I_{90}$ may pass through any one of the first light path and the second light path formed by the light selection layer. The downward linearly-polarized light V3 may pass through the first light path substantially without loss, may be blocked by the second light path. On the other hand, the unpolarized light PD1 may pass through the first light path to become the first sensor linearly-polarized light PD21, and may pass through the second light path to become the second sensor linearly-polarized light PD22. The light amounts of the first sensor linearly-polarized light PD21 and the second sensor linearly-polarized light PD22 may be reduced compared to the unpolarized light PD1.

Figure 12C:
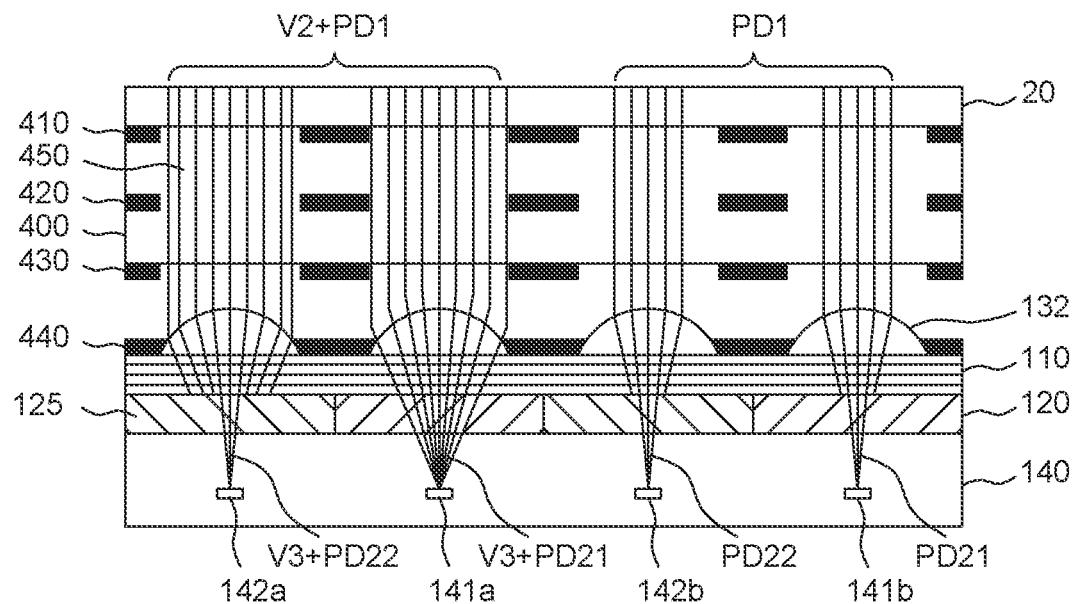

Referring to FIG. 12C, the under-display fingerprint sensor may include the inclined light blocking structure 400 disposed on the lower surface of the display panel 20. The lower surface of the inclined light blocking structure 400 may be spaced apart from the lens 132. The inclined light blocking structure 400 may be formed of the optically transparent material and may include a plurality of layers 410, 420, and 430 formed of the light absorbing material. The first layer 410 may be formed in contact with or close to the lower surface of the display panel 20, the second layer 420 may be disposed inside the inclined light blocking structure 400 to be disposed under the first layer 410, and the third layer 430 may be formed inside the inclined light blocking structure 400 to be disposed on or close to the lower surface of the inclined light blocking structure 400. To this end, in the first to third layers 410, 420, and 430, openings may be formed at positions corresponding to the light paths 450. The opening may be, for example, circular, and its diameter may be substantially equal to or smaller than the diameter of the lens 132. Additionally, the light blocking layer 440 may be formed on the flat surface between the lenses 132. The light blocking layer 440 may be formed of the light absorbing material.

The perpendicular light $I_{90}$ incident substantially perpendicularly toward the light path 450 may reach the curved surface of the lens 132 without refraction. On the other hand, the inclined light $I_\theta$ incident toward the light path 450 at an angle other than perpendicular may be blocked by the first to third layers 410, 420, and 430 of the inclined light blocking structure 400. The remaining portion of rays of the inclined light $I_\theta$ that is not blocked by the first to third layers 410, 420 and 430 may be blocked by the light blocking layer 440 and may not be incident on the light selection layer. On the other hand, the remaining portion of rays of the inclined light $I_\theta$ incident on the curved surface of the lens 132 may be refracted into the light selection layer, but can not reach the focal point f of the lens 132. The light receiving units 141a and 142a may be disposed at the focal point f of the lens 132. The perpendicular light $I_{90}$ and the inclined light $I_\theta$ incident to a region other than the light path 450 may be blocked by the upper surface of the inclined light blocking structure 400 and do not reach the lens 132.

Figure 12D:
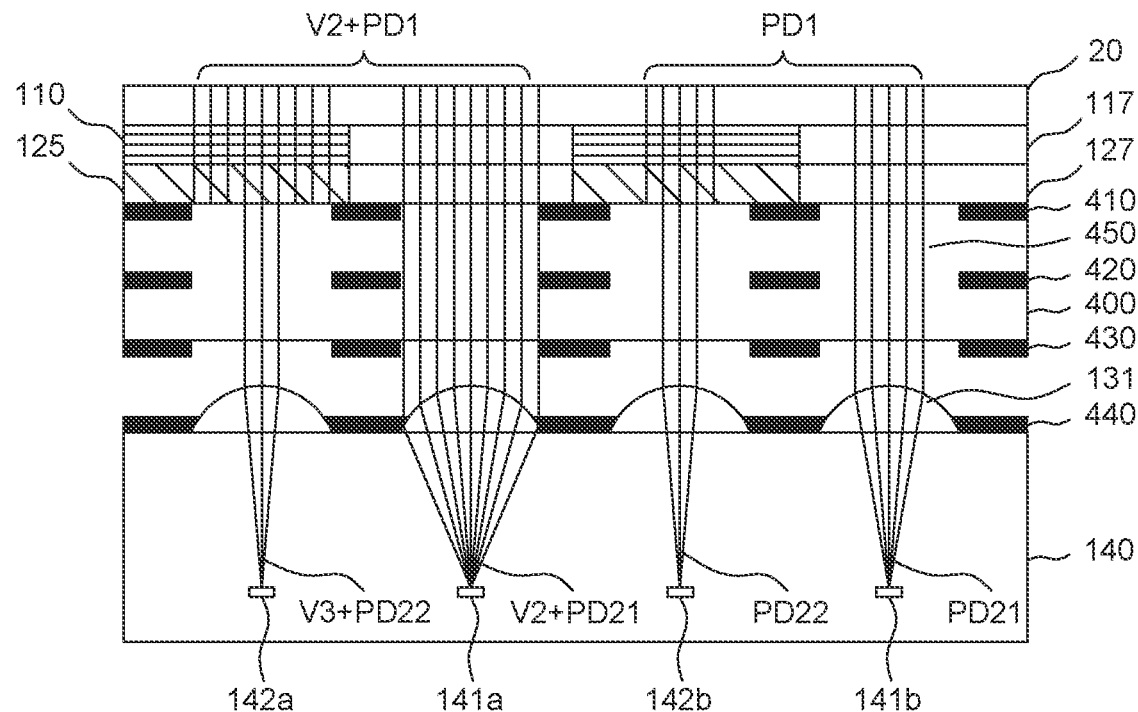

Referring to FIG. 12D, the under-display fingerprint sensor 102 may include the first sensor retarder 110, a first light transmitting layer 117, the second sensor polarizing layer 125, and a second light transmitting layer 127, the inclined light blocking structure 400, the lens 131, and an image sensor 140. Although the light selection layer is exemplified as including the first sensor retarder 110, the first light transmitting layer 117, the second sensor polarizing layer 125, and the second light transmitting layer 127, it may include the second sensor retarder 115, the first light transmitting layer 117, the first sensor polarizing layer 120, and the second light transmitting layer 127. The first light transmitting layer 117 and the second light transmitting layer 127 may be formed of the material having the same or similar light transmittance, and may transmit incident light substantially without loss. When the first sensor retarder 110 is disposed on the second sensor polarizer 125, the first light transmitting layer 117 may be disposed on the second light transmitting layer 127. The image sensor 140 may be disposed under the second sensor polarizer 125 and the second light transmitting layer 127. The first sensor retarder 110 and the first light transmitting layer 117 may be alternately disposed on a first plane, and the second sensor polarizing layer 125 and the second light transmitting layer 127 may be alternately disposed on a second plane. The polarization axis of the second sensor polarizer 125 with respect to the slow axis of the first sensor retarder 110 may be inclined at the second angle, for example, −45 degrees.

The lower surface of the inclined light blocking structure 400 may be spaced apart from the lens 131. The lens 131 may be disposed on the image sensor 140. The lens 131 may focus the substantially perpendicularly propagating light $I_{90}$ which is at least a portion of a plurality of rays of the downward linearly-polarized light V3, the first sensor linearly-polarized light PD21, and the second sensor linearly-polarized light PD22 to the first light receiving unit 141a and the second light receiving unit 142a of the image sensor 140. In addition, the lens 131 may have the inclined light $I_\theta$ which is at least a portion of the plurality of rays of the downward linearly-polarized light V3, the first sensor linearly-polarized light PD21, and the second sensor linearly-polarized light PD22 be deviated from the first light receiving unit 141a and the second light receiving unit 142a.

The downward circularly-polarized light V2 and the unpolarized light PD1 emitted from the lower surface of the display panel 20 may be incident on the upper surfaces of the first sensor retarder 110 and the first light transmitting layer 117. The downward circularly-polarized light V2 and the unpolarized light PD1 may pass through the first light transmitting layer 117 and the second light transmitting layer 127 substantially without loss and may be incident on the first light receiving unit 141. On the other hand, the downward circularly-polarized light V2 having a phase difference of λ/4 between the fast axis and the slow axis becomes the downward linearly-polarized light V3 by the first sensor retarder 110. After the phase difference of λ/4 is added by the first sensor retarder 110, the downward circularly-polarized light V2 having the phase difference of λ/4 between the first polarization element and the second polarization element may become the downward linearly-polarized light V3 of which polarization axis is substantially orthogonal to the polarization axis of the downward linearly-polarized light V1. Meanwhile, the unpolarized light PD1 may pass through the first sensor retarder 110 substantially without loss.

The downward linearly-polarized light V3 emitted from the first sensor retarder 110 does not substantially pass through the second sensor polarizer 125. The second sensor polarizer 125 has the polarization axis inclined at the second angle, for example, −45 degrees with respect to the slow axis of the first sensor retarder 110. Accordingly, since the polarization axis of the downward linearly-polarized light V3 is substantially perpendicular to the polarization axis of the second sensor polarizer 125, the downward linearly-polarized light V3 may be attenuated by the second sensor polarizer 125.

The downward circularly-polarized light V2 and the unpolarized light PD1 may be detected by the first light receiving unit 141a, and the downward linearly-polarized light V3 and the second sensor linearly-polarized light PD22 may be detected by the second light receiving unit 142a. The downward linearly-polarized light V3 derived from the downward circularly-polarized light V2 may not be substantially incident on the second light receiving unit 142a or the downward linearly-polarized light V3 of a very small light amount may be incident on the second light receiving unit 142a. Meanwhile, the unpolarized light PD1 may be detected by the first light receiving unit 141b, and the non-polarizing PD22 may be detected by the second light receiving unit 142b.

Figure 13:
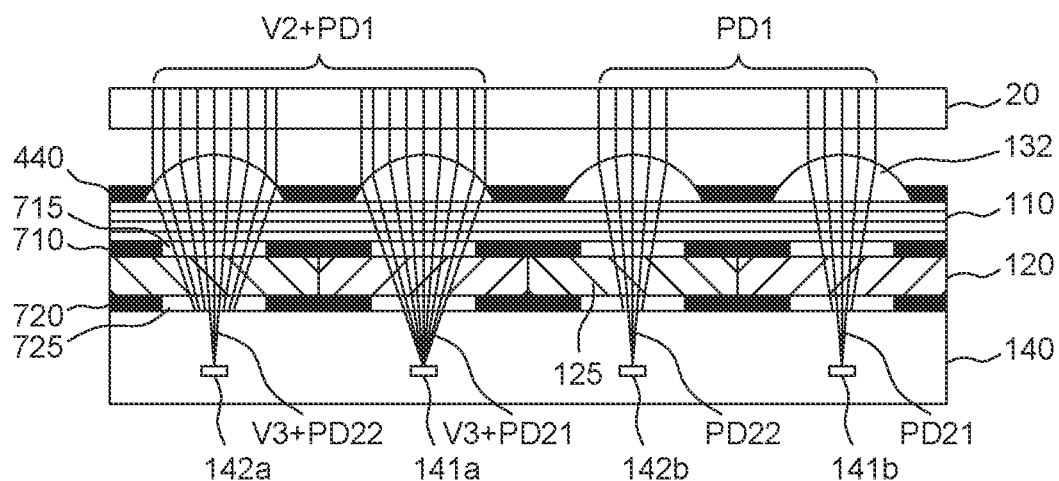
FIG. 13 exemplarily illustrate still another embodiment of the under-display fingerprint sensor that generates a fingerprint image having an improved contrast ratio.

FIG. 13 exemplarily illustrate still another embodiment of the under-display fingerprint sensor that generates a fingerprint image having an improved contrast ratio.

Referring to FIG. 13, the under-display fingerprint sensor may include the lens 132, the light selection layer combined with the inclined light blocking structure, and the image sensor 140. The lens 132 may be spaced apart from the lower surface of the display panel 20. The inclined light blocking structure may include light blocking regions 710 and 720 formed of the light absorbing material and light path regions 715 and 725 formed of the optically transparent material. The light path region may be formed under the lens 132. The inclined light blocking structure may be interposed between the first sensor retarder 110 and the first and second sensor polarizers 120 and 125, and additionally may be further interposed between the first and second sensor polarizers 120 and 125 and the image sensor 140. When the inclined light blocking structure is combined, the light selection layer can block the inclined light $I_\theta$ as well as provide the first light path and the second light path.

Figure 14:
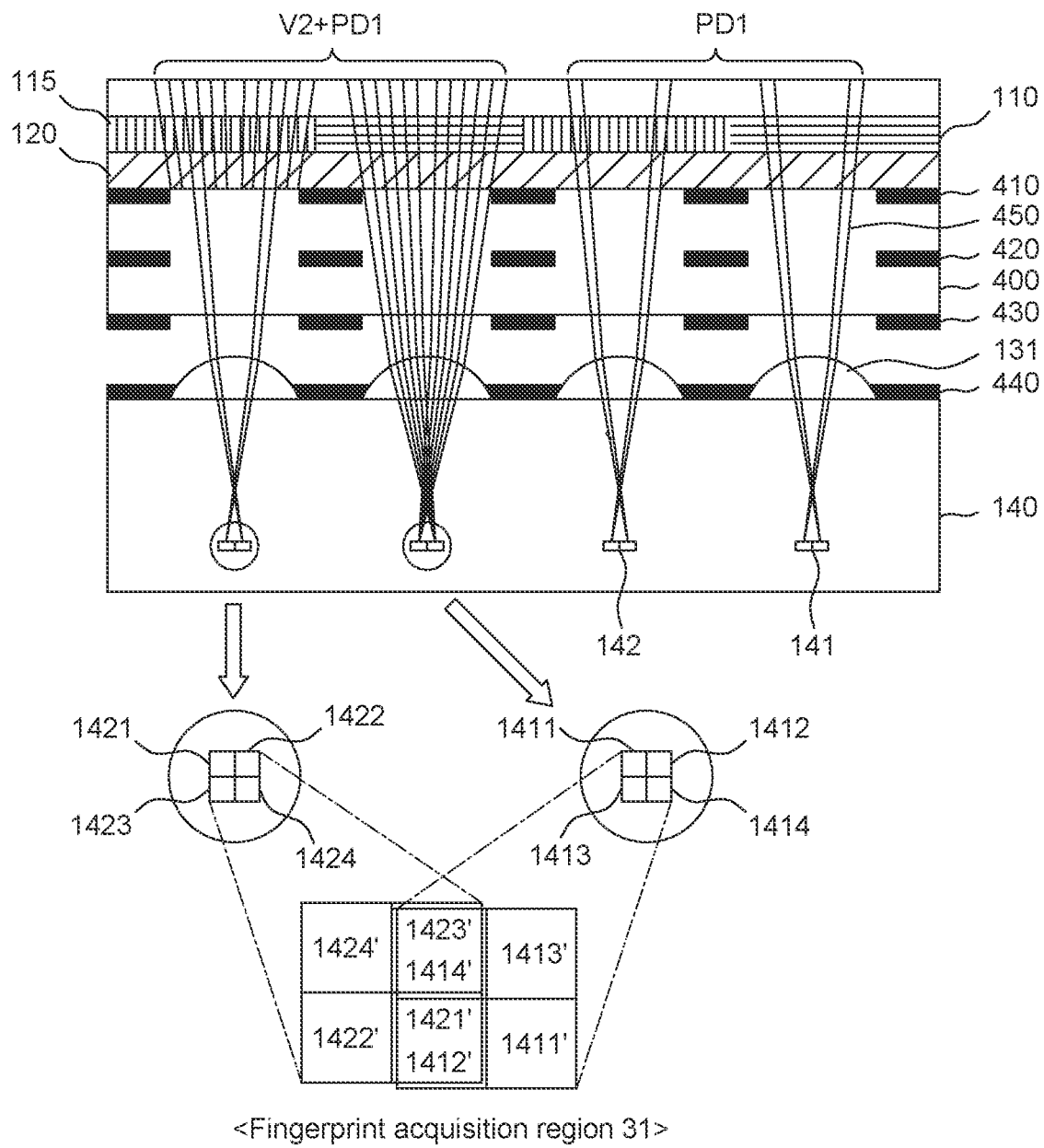
FIG. 14 exemplarily illustrate an under-display fingerprint sensor having a plurality of light-receiving units at a focal point of a lens.

FIG. 14 exemplarily illustrate an under-display fingerprint sensor having a plurality of light-receiving units at a focal point of a lens.

Referring to FIG. 14, the light selection layer may include the first sensor retarder 110, the second sensor retarder 115, and the first polarizer 120. The first light receiving unit 141 of the image sensor 140 may include a plurality of sub light receiving units 1411, 1412, 1413, and 1414, and the second light receiving unit 142 also may include a plurality of sub light receiving units 1421, 1422, 1423, 1424. The four sub light receiving units 1411, 1412, 1413, and 1414 constituting the first light receiving unit 141 receive light emitted from regions that do not overlap each other, and similarly, four sub light receiving units 1421, 1422, 1423, and 1424 constituting the second light receiving unit 142 also receives light from regions that do not overlap each other.

The fingerprint acquisition area 31 corresponding to the sub light receiving unit is inverted by the lens 130. That is, the sub light receiving units 1411, 1412, 1413, and 1414 of the first light receiving unit 141 and the sub areas 1411', 1412', 1413', and 1414' on the fingerprint acquisition area 31 may be symmetrical with respect to the center of the lens 130, and this is the same for the second light receiving unit 142. The sub area 1414' corresponding to the sub light receiving unit 1414 of the first light receiving unit 141 may overlap the sub area 1423' corresponding to the sub light receiving unit 1423 of the second light receiving unit 142, and the sub area 1412' corresponding to the sub light receiving unit 1412 of the first light receiving unit 141 may overlap the subarea 1421' corresponding to the sub light receiving unit 1421 of the second light receiving unit 142.

The perpendicular light $I_{90}$ incident perpendicularly or nearly perpendicularly toward the light path 450 may reach the curved surface of the lens without refraction. On the other hand, the inclined light $I_θ$ incident propagating toward the light path 450 may be blocked by the first to third layers 410, 420, and 430 of the inclined light blocking structure 400. The remaining portion of rays of the inclined light $I_θ$ that is not blocked by the first to third layers 410, 420, and 430 may be blocked by the light blocking layer 440 and does not enter the image sensor 140. Meanwhile, the remaining portion of the rays of the inclined light $I_θ$ incident on the curved surface of the lens may be refracted into the image sensor 140, but does not reach the focal point f of the lens 140. The light receiving units 141 and 142 may be arranged at the focal point f of the lens. The perpendicular light $I_{90}$ and the inclined light $I_θ$ incident to the region other than the light path 450 may be blocked by the upper surface of the inclined light blocking structure 400 and do not reach the lens 131.

Figure 15A:
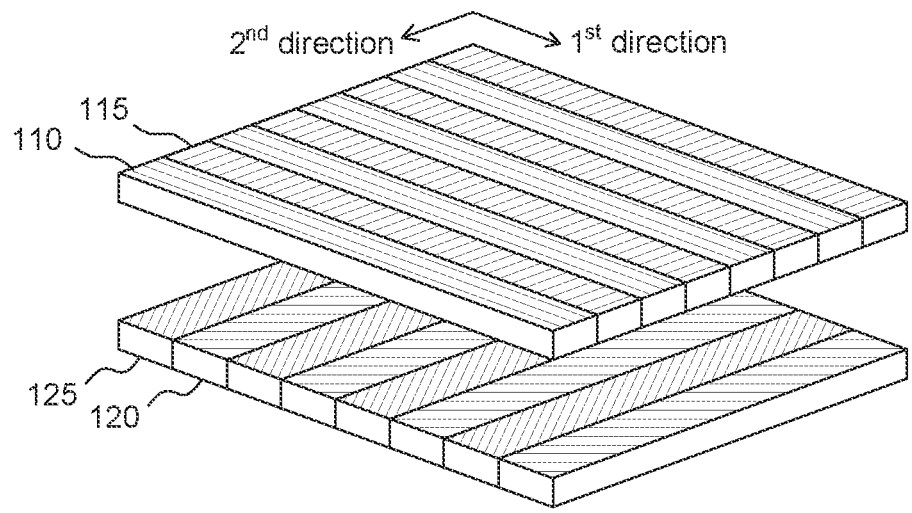
FIG. 15A, FIG. 15B, and FIG. 15C exemplarily illustrate a light selection layer in which the first light path and the second light path are arranged in zigzag manner.
Figure 15B:
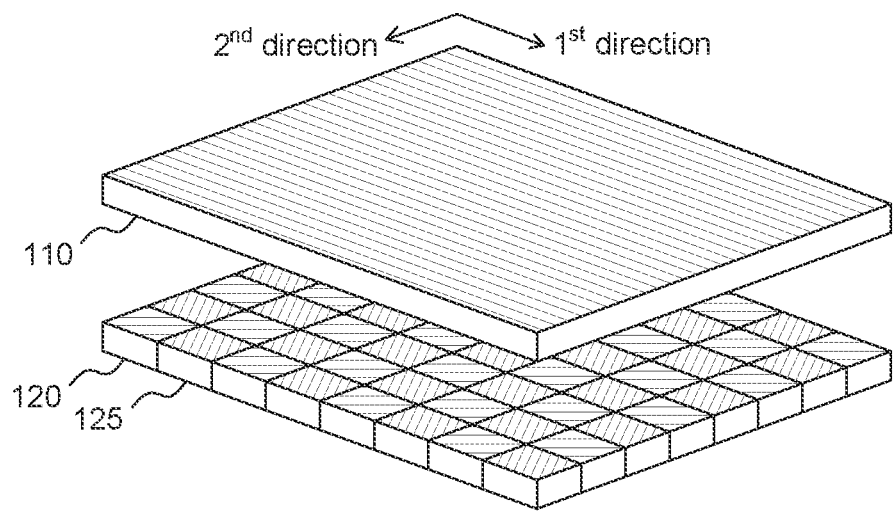
Figure 15C:
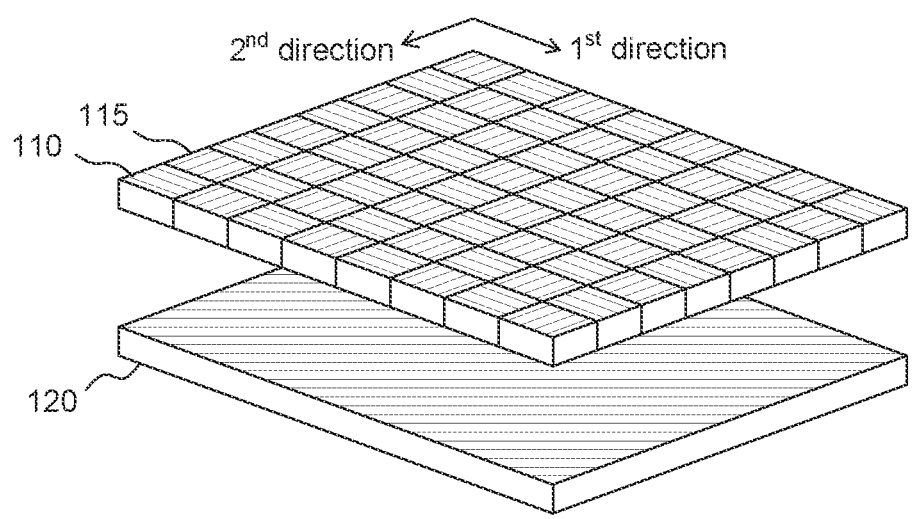

FIG. 15A, FIG. 15B, and FIG. 15C exemplarily illustrate a light selection layer in which the first light path and the second light path are arranged in zigzag manner.

Referring to FIG. 15A, the light selection layer may include the first sensor retarder 110, the second sensor retarder 115, the first sensor polarizer 120, and the second sensor polarizer 125.

The first sensor retarder 110 and the second sensor retarder 115 may have different slow axes and may be alternately arranged in the second direction. For example, the slow axes of the first sensor retarder 110 and the second sensor retarder 115 may be orthogonal. The first sensor retarder 110 and the second sensor retarder 115 may have a rectangular shape extending in the first direction.

The first sensor polarizer 120 and the second sensor polarizer 125 may be disposed under the first sensor retarder 110 and the second sensor retarder 115. The first sensor polarizer 120 and the second sensor polarizer 125 may have different polarization axes and may be formed by being alternately arranged in the first direction. For example, the polarization axes of the first sensor polarizer 120 and the second sensor polarizer 125 may be orthogonal. The first sensor polarizer 120 and the second sensor polarizer 125 may have a rectangular shape extending in the second direction. The polarization axis of the first sensor polarizer 120 may be inclined at the first angle with respect to the slow axis of the first sensor retarder 110, and the polarization axis of the second sensor polarizer 125 may be inclined at the second angle with respect to the slow axis of the first sensor retarder 110.

The first sensor retarder 110, the second sensor retarder 115, the first sensor polarizer 120, and the second sensor polarizer 125 allow the same light path to be diagonally arranged (namely, in zigzag manner). That is, four second light paths may be disposed around one first light path or four first light paths may be disposed around one second light path. Since the first sensor retarder 110—the first sensor polarizer 120 and the second sensor retarder 115—the second sensor polarizer 125 pass the downward linearly-polarized light V3 and the first sensor linearly-polarized light PD21, the light receiving unit disposed under the first sensor retarder 110—the first sensor polarizer 120 and the second sensor retarder 115—the second sensor polarizer 125 may be the first light receiving unit 141 that receives the light passing through the first light path. On the other hand, since the first sensor retarder 110—the second sensor polar- izer 125 and the second sensor retarder 115—the first sensor polarizer 120 pass only the second sensor linearly-polarized light PD22, the light receiving unit disposed under the first sensor retarder 110—the second sensor polarizer 125 and the second sensor retarder 115—the first sensor polarizer 110 may be the second light receiving unit that receives light passed through the second light path.

Referring to FIG. 15B, the light selection layer may include the first sensor retarder 110, the first sensor polarizer 120, and the second sensor polarizer 125.

In the first sensor retarder 110, the slow axis may be formed substantially horizontally throughout.

The first sensor polarizer 120 and the second sensor polarizer 125 may be disposed under the first sensor retarder 110. The first sensor polarizer 120 and the second sensor polarizer 125 may have different polarization axes and may be alternately arranged. For example, the first sensor polarizer 120 and the second sensor polarizer 125 may have a rectangular shape and may be arranged in zigzag manner. The polarization axis of the first sensor polarizer 120 may be inclined at the first angle with respect to the slow axis of the first sensor retarder 110, and the polarization axis of the second sensor polarizer 125 may be inclined at the second angle with respect to the slow axis of the first sensor retarder 110.

Since the first sensor polarizer 120 passes the downward linearly-polarized light V3 and the first sensor linearly-polarized light PD21, the light receiving unit disposed under the first sensor polarizer 120 may be the first light receiving unit 141 that receives the light passing through the first light path. On the other hand, since the second sensor polarizer 125 passes only the second sensor linearly-polarized light PD22, the light receiving unit disposed under the second sensor polarizer 125 may be the light receiving unit 142 that receives the light passing through the second light path.

Meanwhile, although not shown, the first sensor retarder 110 may be replaced with the second sensor retarder 115. Even in this case, the first light path and the second light path may be still arranged in zigzag manner.

Referring to FIG. 15C, the light selection layer may include the first sensor retarder 110, the second sensor retarder 115, and the first sensor polarizer 120.

The first sensor retarder 110 and the second sensor retarder 115 having different slow axes may be alternately arranged. For example, the slow axes of the first sensor retarder 110 and the second sensor retarder 115 having different slow axes may be orthogonal. The first sensor retarder 110 and the second sensor retarder 115 may have a rectangular shape and may be arranged in zigzag manner.

The first sensor polarizer 120 may be disposed under the first sensor retarder 110 and the second sensor retarder 115. In the first sensor polarizer 120, the polarization axis may be formed to be the same throughout. The polarization axis of the first sensor polarizer 120 may be inclined at the first angle with respect to the slow axis of the first sensor retarder 110 and at the second angle with respect to the slow axis of the second sensor retarder 115.

Since the first sensor polarizer 120 disposed under the first sensor retarder 110 passes the downward linearly-polarized light V3 and the first sensor linearly-polarized light PD21 that have passed through the first sensor retarder 110, the light receiving unit disposed under the first sensor retarder 110 may be the first light receiving unit 141 that receives the light passing through the first light path. On the other hand, since the first sensor polarizer 120 disposed under the second sensor retarder 115 passes only the second sensor linearly-polarized light PD22 that has passed through the second sensor retarder 115, the light receiving unit disposed under the second sensor retarder 115 is the second light receiving unit 142 that receives the light passing through the second light path.

Meanwhile, although not shown, the first sensor polarizer 120 may be replaced with the second sensor polarizer 125. Even in this case, the first light path and the second light path may be arranged in zigzag manner.

Figure 16:
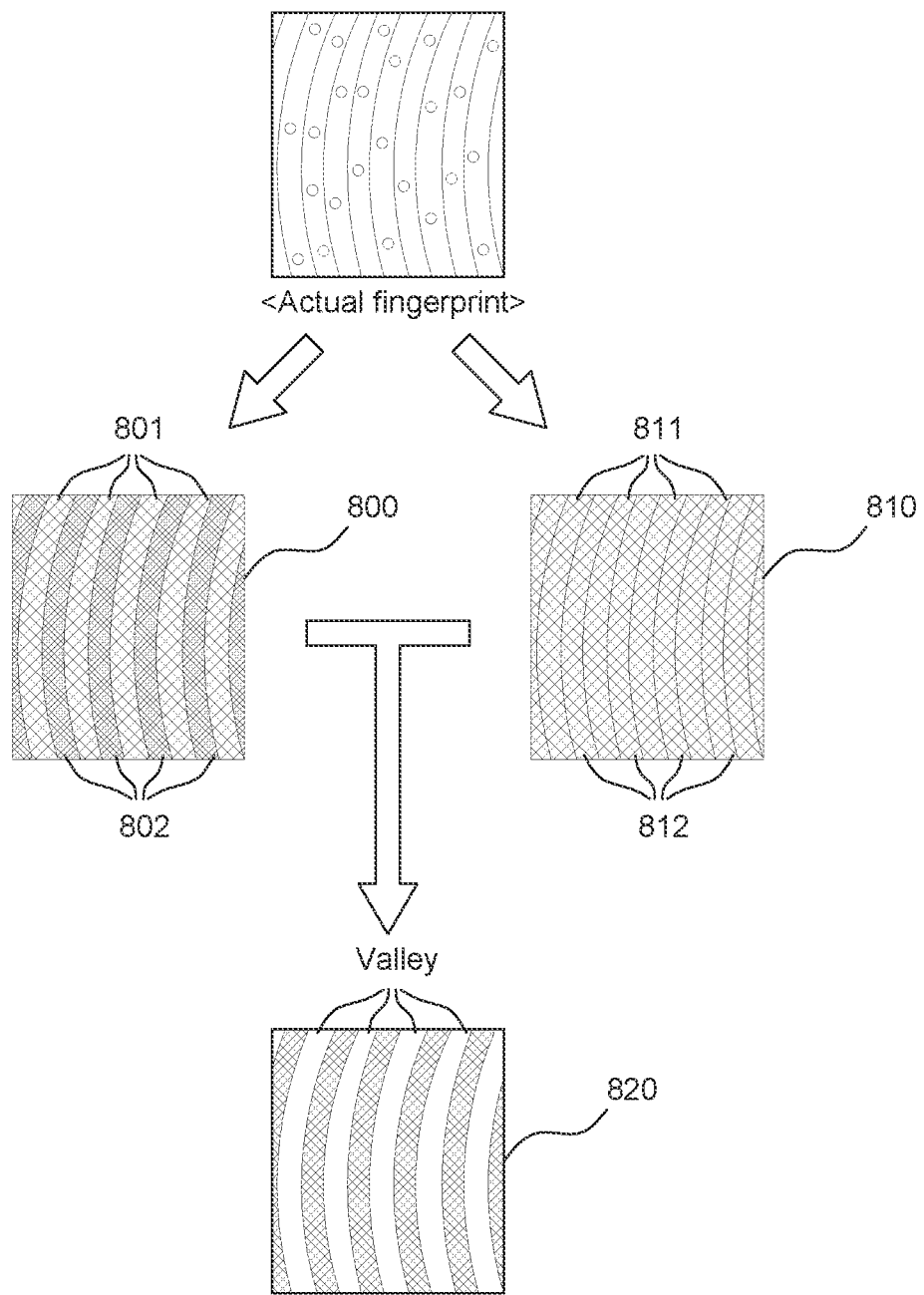
FIG. 16 exemplarily illustrate a method of improving the contrast ratio of a fingerprint image.

FIG. 16 exemplarily illustrate a method of improving the contrast ratio of a fingerprint image.

The under-display fingerprint sensor described with reference to FIG. 1 to FIG. 15C generates a first fingerprint image 800 using light received through the first light path, and a second fingerprint image 810 using light received through the second light path. In the light selection layer, since the first light path and the second light path are arranged in zigzag manner, the first light receiving unit 141 and the second light receiving unit 142 close to each other may receive the perpendicular light emitted from the same point on the fingerprint acquisition area 31. For this reason, the first fingerprint image 800 and the second fingerprint image 810 are images obtained from the substantially same fingerprint acquisition area 31.

In the first fingerprint image 800, the valley 801 of the fingerprint may correspond to the brightness of the downward linearly-polarized light V3 and the first sensor linearly-polarized light PD21, and the ridge 802 of the fingerprint may correspond to the brightness of the first sensor linearly-polarized light PD21 so that the valley 801 and the ridge 802 may be distinguishable from each other, but the contrast ratio is relatively low. On the other hand, in the second fingerprint image 810, the valleys 811 and ridges 812 of the fingerprint may correspond to the brightness of the second sensor linearly-polarized light PD22, so that the valleys 811 and ridges 812 may not be distinguishable.

By subtracting the second fingerprint image 810 from the first fingerprint image 800, a fingerprint image 820 with an improved contrast ratio may be generated. The pixel value of the pixel located at (x, y) position of the first fingerprint image 800 may be subtracted from the pixel value of the pixel located at the same position on the second fingerprint image 810. This method has the effect of removing the first sensor linearly-polarized light PD21 and the second sensor linearly-polarized light PD22 incident on the first light receiving unit 141 and the second light receiving unit 142. In addition, the contrast ratio may be improved by using the first fingerprint image 800 and the second fingerprint image 810 in various ways.

The above description of the invention is exemplary, and those skilled in the art can understand that the invention can be modified in other forms without changing the technical concept or the essential feature of the invention. Therefore, it should be understood that the above-mentioned embodiments are exemplary in all respects, but are not definitive.

The scope of the invention is defined by the appended claims, not by the above detailed description, and it should be construed that all changes or modifications derived from the meanings and scope of the claims and equivalent concepts thereof are included in the scope of the invention.

What is claimed is:

1. An under-display fingerprint sensor of generating a fingerprint image of a finger in contact with a glass cover disposed over a display panel, comprising:
   a light selection layer, being disposed under a display panel, configured for converting a downward circularly-polarized light that is reflected in a region below a valley of a fingerprint in contact with an upper surface of a glass cover into a downward linearly-polarized light, and configured for converting an unpolarized light that propagates downwardly from the display panel into a sensor linearly-polarized light;
   a plurality of lenses, being disposed apart from the light selection layer, configured for refracting the downward linearly-polarized light and the sensor linearly-polarized light that propagate in a perpendicular direction toward each focal point, and configured for deviating the downward linearly-polarized light and the sensor linearly-polarized light that propagate at an angle other than perpendicular from the focal point; and
   an image sensor having a plurality of light receiving units disposed at each focal point of the plurality of lenses to receive the downward linearly-polarized light and the sensor linearly-polarized light that are refracted toward each focal point, wherein a first light receiving unit among the plurality of light receiving units receives the downward linearly-polarized light and the sensor linearly-polarized light and a second light receiving unit among the plurality of light receiving units receives the sensor linearly-polarized light.

2. The under-display fingerprint sensor of claim 1, wherein the light selection layer comprises:
   a sensor retarder configured for converting the downwardly circularly-polarized light into the downward linearly-polarized light and configured for passing the unpolarized light; and
   a sensor polarizer, being disposed under the sensor retarder, configured for passing the downward linearly-polarized light, and configured for converting the unpolarized light into the sensor linearly-polarized light,
   wherein a light amount of the unpolarized light is reduced by the sensor polarizer.

3. The under-display fingerprint sensor of claim 2, wherein the sensor polarizer has a polarization axis inclined at +45 degrees with respect to a slow axis of the sensor retarder layer.

4. The under-display fingerprint sensor of claim 1, wherein the light selection layer comprises:
   a first sensor retarder configured for converting the downward circularly-polarized light into the downward linearly-polarized light;
   a first sensor polarizer, being disposed under the first sensor retarder, configured for passing the downward linearly-polarized light, and configured for converting the unpolarized light into a first sensor linearly-polarized light; and
   a second sensor polarizer, being disposed under the first sensor retarder, configured for attenuating the downward linearly-polarized light, configured for converting the unpolarized light into a second sensor linearly-polarized light,
   wherein a combination of the first sensor retarder and the first sensor polarizer is a first light path and a combination of the first sensor retarder and the second sensor polarizer is a second light path.

5. The under-display fingerprint sensor of claim 1, wherein the light selection layer comprises:
   a first sensor retarder and a second sensor retarder alternately disposed in a first direction and having slow axes orthogonal to each other; and
   a first sensor polarizer and a second sensor polarizer alternately disposed under the first sensor retarder and the second sensor retarder in a second direction and having polarization axes orthogonal to each other, wherein a combination of the first sensor retarder and the first sensor polarizer and a combination of the second sensor retarder and the second sensor polarizer are a first light path and a combination of the second sensor retarder and the first sensor polarizer and a combination of the first sensor retarder and the first sensor polarizer are a second light path.

6. The under-display fingerprint sensor of claim 1 further comprising an inclined light blocking structure, being interposed between the light selection layer and the image sensor and having a plurality of through holes extending vertically from an upper surface to a lower surface thereof, wherein one of the plurality of lenses is accommodated in one of the plurality of through holes.

7. The under-display fingerprint sensor of claim 1, wherein the image sensor comprises a plurality of layers being interposed between an upper surface of the image sensor and the plurality of light receiving units and extending in a horizontal direction,
wherein the plurality of layers have openings formed over each of the plurality of light receiving units.

8. The under-display fingerprint sensor of claim 7, wherein diameters of the openings formed in the plurality of layers decreases as it approaches the plurality of light receiving units.

9. The under-display fingerprint sensor of claim 1 further comprising an inclined light blocking structure being disposed on a lower surface of the light selection layer and having a plurality of layers that extend in a horizontal direction,
wherein the plurality of layers have openings formed over each of the plurality of lenses,
wherein a lower surface of the inclined light blocking structure is spaced apart from the plurality of lenses.

10. The under-display fingerprint sensor of claim 9 further comprising a light blocking layer formed in a flat surface between the plurality of lenses to block light incident into the image sensor.

11. The under-display fingerprint sensor of claim 1, wherein one lens corresponds to a plurality of sub light receiving units constituting one light receiving unit and is configured for focusing light belonging to a range of perpendicular incidence angle that has passed through a plurality of light paths on each of the plurality of sub light receiving units.

12. An under-display fingerprint sensor of generating a fingerprint image of a finger in contact with a glass cover disposed over a display panel, comprising:
a light selection layer, being disposed under a display panel, configured for converting a downward circularly-polarized light that is reflected in a region below a valley of a fingerprint in contact with an upper surface of a glass cover into a downward linearly-polarized light, and configured for converting an unpolarized light that propagates downwardly from the display panel into a sensor linearly-polarized light, wherein a lower surface of the light selection layer is an interface between two media having different refractive indices, wherein the downward linearly-polarized light and the sensor linearly-polarized light perpendicularly incident on the lower surface of the light selection layer propagate in the perpendicular direction and the downward linearly-polarized light and the sensor linearly-polarized light incident on the lower surface of the light selection layer at the angle other than perpendicular are refracted at a refraction angle greater than an incidence angle;
a plurality of lenses, being disposed apart from the light selection layer, configured for refracting the downward linearly-polarized light and the sensor linearly-polarized light that propagate in a perpendicular direction toward each focal point, and configured for deviating the downward linearly-polarized light and the sensor linearly-polarized light that propagate at an angle other than perpendicular from the focal point; and
an image sensor having a plurality of light receiving units disposed at each focal point of the plurality of lenses to receive the downward linearly-polarized light and the sensor linearly-polarized light that are refracted toward each focal point.

13. An under-display fingerprint sensor of generating a fingerprint image of a finger in contact with a glass cover disposed over a display panel, comprising:
a light selection layer, being disposed under a display panel, configured for converting a downward circularly-polarized light that is reflected in a region below a valley of a fingerprint in contact with an upper surface of a glass cover into a downward linearly-polarized light, and configured for converting an unpolarized light that propagates downwardly from the display panel into a sensor linearly-polarized light, wherein the light selection layer comprises:
a first sensor retarder and a second sensor retarder having slow axes orthogonal to each other; and
a first sensor polarizer disposed under the first sensor retarder and the second sensor retarder,
wherein a combination of the first sensor retarder and the first sensor polarizer is a first light path, and a combination of the second sensor retarder and the first sensor polarizer is a second light path;
a plurality of lenses, being disposed apart from the light selection layer, configured for refracting the downward linearly-polarized light and the sensor linearly-polarized light that propagate in a perpendicular direction toward each focal point, and configured for deviating the downward linearly-polarized light and the sensor linearly-polarized light that propagate at an angle other than perpendicular from the focal point; and
an image sensor having a plurality of light receiving units disposed at each focal point of the plurality of lenses to receive the downward linearly-polarized light and the sensor linearly-polarized light that are refracted toward each focal point.

* * * * *